US012774210B2

(12) United States Patent
Bishop et al.

(10) Patent No.: US 12,774,210 B2
(45) Date of Patent: Oct. 27, 2026

(54) PROCESS FOR PRODUCING GRAPHENE, OTHER CARBON ALLOTROPES AND MATERIALS

(71) Applicant: Elemental Advanced Materials, Inc., Houston, TX (US)

(72) Inventors: Ian Bishop, Houston, TX (US); Ronald G. Presswood, Jr., Houston, TX (US)

(73) Assignee: Elemental Advanced Materials, Inc., Houston, TX (US)

( * ) Notice: Subject to any disclaimer, the term of this patent is extended or adjusted under 35 U.S.C. 154(b) by 211 days.

(21) Appl. No.: 18/415,066

(22) Filed: Jan. 17, 2024

(65) Prior Publication Data

US 2024/0200158 A1 Jun. 20, 2024

Related U.S. Application Data

(60) Provisional application No. 63/439,463, filed on Jan. 17, 2023.

(51) Int. Cl.

| | |
|---|---|
| ***C01B 32/05*** | (2017.01) |
| ***C01B 32/15*** | (2017.01) |
| ***C01B 32/182*** | (2017.01) |
| ***C01B 32/20*** | (2017.01) |
| ***C10B 49/14*** | (2006.01) |

(52) U.S. Cl.

CPC .............. *C01B 32/05* (2017.08); *C01B 32/15* (2017.08); *C01B 32/182* (2017.08); *C01B 32/20* (2017.08); *C10B 49/14* (2013.01)

(58) Field of Classification Search

CPC ....... C01B 32/05; C01B 32/182; C01B 32/20; C01B 32/15; C10B 49/14

See application file for complete search history.

(56) References Cited

U.S. PATENT DOCUMENTS

| | | | |
|---|---|---|---|
| 3,718,733 | A | 2/1973 | Gehri |
| 3,812,620 | A | 5/1974 | Titus et al. |
| 4,286,985 | A | 9/1981 | Van Linden et al. |

(Continued)

FOREIGN PATENT DOCUMENTS

| | | | |
|---|---|---|---|
| CN | 1546614 | A | 11/2004 |
| CN | 201273767 | Y | 7/2009 |

(Continued)

OTHER PUBLICATIONS

Hemrick, James G. et al. Development and Application of Refractory Materials for Molten Aluminum Applications. International Journal of Applied Ceramic Technology 5(9) pp. 265-277. DOI:10.1111/j.1744-7402.2008.02213.x (Year: 2008).*

(Continued)

*Primary Examiner* — Tima M. McGuthry-Banks

(74) *Attorney, Agent, or Firm* — FBT Gibbons LLP

(57) ABSTRACT

Methods and systems are described for the synthesis of graphene, synthetic graphite, and other carbon allotropes. Thus, the method describes a method to synthesize carbon nanostructures and synthetic graphite by using unrecyclable materials, such as plastic wastes (i.e., Polypropylene, Styrene, Polyethylene, Poly Vinyl Chloride, PVDF, tires, etc.), Liquid wastes (i.e. tank bottoms, PVDF liquid foams, contaminated oils, etc.) (unrecyclable carbons) regardless of its state, cleanliness, or whether it is contaminated with other byproducts.

19 Claims, 22 Drawing Sheets

(56) References Cited

U.S. PATENT DOCUMENTS

| | | | |
|---|---|---|---|
| 4,345,990 A | 8/1982 | Fahlstrom et al. | |
| 4,459,135 A | 7/1984 | Glasser | |
| 4,473,537 A | 9/1984 | Ford, Jr. et al. | |
| 4,649,867 A | 3/1987 | Cordier et al. | |
| 4,900,429 A | 2/1990 | Richardson | |
| 5,000,101 A | 3/1991 | Wagner | |
| 5,350,440 A | 9/1994 | Katyal et al. | |
| 5,395,405 A | 3/1995 | Nagel et al. | |
| 5,396,850 A | 3/1995 | Conochie et al. | |
| 5,443,572 A | 8/1995 | Wilkinson et al. | |
| 5,640,707 A | 6/1997 | Nagel et al. | |
| 5,640,708 A | 6/1997 | Conochie et al. | |
| 5,645,615 A | 7/1997 | Malone et al. | |
| 5,765,489 A | 6/1998 | Hugentobler et al. | |
| 5,776,420 A | 7/1998 | Nagel | |
| 5,858,059 A | 1/1999 | Abramovich et al. | |
| 5,863,314 A | 1/1999 | Morando | |
| 6,011,193 A | 1/2000 | Myler et al. | |
| 6,264,722 B1 | 7/2001 | Kepplinger et al. | |
| 6,322,745 B1 | 11/2001 | Leigh et al. | |
| 6,333,016 B1 * | 12/2001 | Resasco | C01B 32/162 423/445 B |
| 6,414,143 B1 | 7/2002 | Cannizzo et al. | |
| 6,685,754 B2 | 2/2004 | Kindig et al. | |
| 7,217,123 B2 | 5/2007 | Schmeler | |
| 7,318,890 B1 | 1/2008 | Malone | |
| 7,335,320 B2 | 2/2008 | Kindig et al. | |
| 7,875,090 B2 | 1/2011 | Dietenberger et al. | |
| 8,016,912 B2 | 9/2011 | Fekete et al. | |
| 8,303,916 B2 | 11/2012 | Collins et al. | |
| 8,540,954 B2 | 9/2013 | Olsen | |
| 8,628,741 B2 | 1/2014 | Presswood, Jr. et al. | |
| 8,765,017 B2 | 7/2014 | Nickels et al. | |
| 9,023,308 B2 | 5/2015 | Shankman | |
| 9,156,017 B2 | 10/2015 | Lee et al. | |
| 9,216,905 B2 | 12/2015 | Presswood, Jr. et al. | |
| 9,446,376 B2 | 9/2016 | Lee et al. | |
| 9,540,244 B2 | 1/2017 | Zhang et al. | |
| 10,316,375 B2 | 6/2019 | Presswood, Jr. et al. | |
| 10,427,192 B2 * | 10/2019 | Presswood, Jr. | F01K 7/16 |
| 10,994,315 B2 | 5/2021 | Presswood, Jr. et al. | |
| 11,299,396 B2 | 4/2022 | Caroca et al. | |
| 11,359,253 B2 | 6/2022 | Presswood, Jr. et al. | |
| 11,975,970 B2 | 5/2024 | Wagner et al. | |
| 12,241,132 B2 | 3/2025 | Presswood, Jr. et al. | |
| 2003/0109768 A1 * | 6/2003 | Wagner | C22B 7/001 588/314 |
| 2005/0169824 A1 | 8/2005 | Downs et al. | |
| 2006/0008403 A1 * | 1/2006 | Wagner | B82Y 30/00 423/439 |
| 2006/0208400 A1 | 9/2006 | Schmeler | |
| 2007/0090017 A1 | 4/2007 | Maxwell | |
| 2007/0183966 A1 | 8/2007 | Nakagawa et al. | |
| 2009/0071289 A1 | 3/2009 | Fekete et al. | |
| 2010/0283009 A1 | 11/2010 | Nickels et al. | |
| 2011/0171114 A1 | 7/2011 | Shaw | |
| 2012/0021222 A1 | 1/2012 | Lian et al. | |
| 2013/0071306 A1 | 3/2013 | Camp et al. | |
| 2013/0180363 A1 | 7/2013 | Nakamoto et al. | |
| 2014/0007499 A1 | 1/2014 | Stamires et al. | |
| 2014/0227211 A1 | 8/2014 | Shankman | |
| 2015/0152344 A1 | 6/2015 | Gueh | |
| 2015/0307356 A1 | 10/2015 | Zhang et al. | |
| 2016/0030987 A1 | 2/2016 | Riedewald | |
| 2016/0137506 A1 | 5/2016 | Cho et al. | |
| 2017/0327379 A1 | 11/2017 | Ghimire et al. | |
| 2020/0180961 A1 | 6/2020 | Gracia Caroca et al. | |
| 2020/0378014 A1 | 12/2020 | Licht | |
| 2021/0009427 A1 | 1/2021 | Mennell et al. | |
| 2022/0089445 A1 | 3/2022 | Wagner | |

FOREIGN PATENT DOCUMENTS

| | | | | |
|---|---|---|---|---|
| DE | 19731027 C1 | 10/1998 | | |
| DE | 102010010803 A1 | 9/2011 | | |
| EP | 0793071 A2 | 9/1997 | | |
| EP | 2281779 A2 * | 2/2011 | B82Y 40/00 | |
| GB | 284722 A | 11/1928 | | |
| GB | 1528655 | 10/1978 | | |
| GB | 1528655 A | 10/1978 | | |
| JP | 60-213353 | 10/1985 | | |
| JP | 11-309335 A | 11/1999 | | |
| KR | 20020077934 | 10/2002 | | |
| KR | 20020077934 A | 10/2002 | | |
| WO | 2000/001855 A1 | 1/2000 | | |
| WO | 2005083130 A1 | 9/2005 | | |
| WO | 2008074659 A1 | 6/2008 | | |
| WO | 2011137113 A1 | 11/2011 | | |
| WO | 2014032843 A1 | 3/2014 | | |
| WO | 2014167139 A2 | 10/2014 | | |
| WO | 2016187144 A1 | 11/2016 | | |
| WO | 2022120411 A1 | 6/2022 | | |
| WO | 2024233998 A1 | 11/2024 | | |

OTHER PUBLICATIONS

Sekitani, Tsuyoshi et al. Stretchable active-matrix organic light-emitting diode display using printable elastic conductors. Nature Materials. vol. 9, pp. 494-499. DOI: 10.1038/NMAT2459 (Year: 2009).*

Helmenstine, Todd, "Activity Series of Metals," About.com Chemistry, About.com, Dec. 22, 2010. Web. Jun. 11, 2014. http://chemistry.about.com/od/chartstables/a/Activity-Series-Of-Metls.htm.

Yamaguchi, Katsunori et al., "Copper Enrichment of Iron-Base Alloy Scraps by Phase Separation in Liquid Fe—Cu—P and Fe—Cu—P C Systems," Materials Transactions, vol. 47, No. 7, p. 1864-1868. (Year: 2006).

International Search Report and Written Opinion dated Jun. 10, 2024 for Application No. PCT/US24/11791, 10 pages.

Liu et al. "Carbon Nano-Onions Made Directly from CO2 by Molten Electrolysis for Greenhouse Gas Mitigation", Advanced Sustainable Systems, Jul. 19, 2019, 10 pages, vol. 3, Issue 10.

Glad et al,, "Synthesis of core-shell copper-graphite submicronic particles and carbon nano-onions by spark discharges in liquid hydrocarbons", Scientific reports 11.1, Apr. 6, 2021, 12 pages.

Technological Resources Pty. Ltd., "A Direct Smelting Processing", PCT Search Report—WO-0001855, PCT/AU99/00538, International Publication Date: Jan. 13, 2000, 35 pages.

Presswood, Ronald G. Jr., et al., "Method To Recycle Plastics, Electronics, Munitions, Or Propellants Using A Metal Reactant Alloy Composition", European Search Report for Application No. 16797110.0, Nov. 30, 2018, 16 pages.

Tanaka, Shinichiro et al., Japanese Office Action for Application No. 2018-511364, Dec. 12, 2019.

* cited by examiner

PROCESS FOR PRODUCING GRAPHENE, OTHER CARBON ALLOTROPES AND MATERIALS

CROSS REFERENCE TO RELATED INFORMATION

This application claims the benefit of United States of America priority application No. 63/439,463 filed on Jan. 17, 2023, titled "Process for Producing Graphene, Other Carbon Allotropes and Materials," the contents of which are hereby incorporated herein in its entirety.

TECHNICAL FIELD

The present disclosure generally relates to the technical field of synthesis of graphene, synthetic graphite, and other carbon allotropes.

BACKGROUND

The synthesis of carbon allotropes including graphene, is highly dependent of carbon sources such as high purity gases, graphite or other organic sources of carbon. Likewise, the purity of metals or metal mix involved in the synthesis of carbon nanomaterials plays an important role into reaction yield and crystallinity of the nanomaterials.

Graphene which was initially isolated as a single layer of graphite and was obtained by its mechanical exfoliation. Further, graphene oxide (GO) was isolated as a product of the oxidation of graphite. Whereas the reduced graphene oxide (RGO) is obtained by the reacting of reductive agents with GO. Currently, graphene rather refers to a class of nanomaterials that includes: nanoplatelets (GNP), few-layer graphene (FLG), single-layer graphene (SLG), multi-layer graphene (MLG), graphene oxide (GO), reduced graphene oxide (RGO), etc.

Many techniques have been developed for the synthesis of graphene, including chemical exfoliation, chemical vapor deposition (CVD), thermal plasma, flash growth, electrochemical exfoliation, micromechanical exfoliation, laser ablation, ignition chamber, pyrolysis, etc. These techniques may accommodate different sources of carbon and may or may not require metals as catalyst. Techniques such as CVD, thermal plasma, laser ablation, ignition chamber, and flash growth may produce highly crystalline graphene with a single or few layers. Nonetheless, each of these techniques require a controlled atmosphere, and high purity gases including hydrogen and/or oxygen, plus high voltage discharge that need highly controlled conditions.

Likewise, synthetic graphite is majorly obtained by the Hazor technique that describes the chemical decomposition of methane catalyzed by iron-ore. Furthermore, other petroleum derivates are used to produce synthetic graphite.

Albeit, the current methods of synthesis of both carbon nanostructures or synthetic graphite rely on conventional sources of carbon and catalysts, a demand of unrecyclable carbon precursor materials and metals remains to be addressed.

SUMMARY

One embodiment under the present disclosure comprises a method for manufacturing carbon material. The method includes mixing a carbon precursor with a catalyst in a controlled oxygen free environment, where the reaction is carried-out at a range from about 600° C. to 1400° C.

Another embodiment possible method embodiment under the present disclosure is a method of synthesizing carbon. The method comprises mixing a feed stock with molten aluminum; injecting the molten aluminum and feed stock mixture into a reaction vessel containing further molten aluminum, wherein the injection occurs below the surface of the molten aluminum in the reaction vessel; and reacting the feed stock with the molten aluminum, such that one or more carbon-containing products are formed.

Another embodiment under the present disclosure is a reaction vessel for reacting a carbon precursor with molten metal. The reaction vessel comprises: a reaction vessel wall; a refractory material lining an inside of the reaction vessel wall; and a cooling plate attached to an outside of the reaction vessel wall, wherein the cooling plate forms a channel for a cooling fluid between the cooling plate and the reaction vessel wall. It further comprises an aluminum feed line passing through to the reaction vessel wall; an injection line passing through the reaction vessel wall and having an outlet in the reaction vessel, and configured to carry the carbon precursor into the reaction vessel; and one or more collection lines passing through the reaction vessel wall and configured to collect one or more output products.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
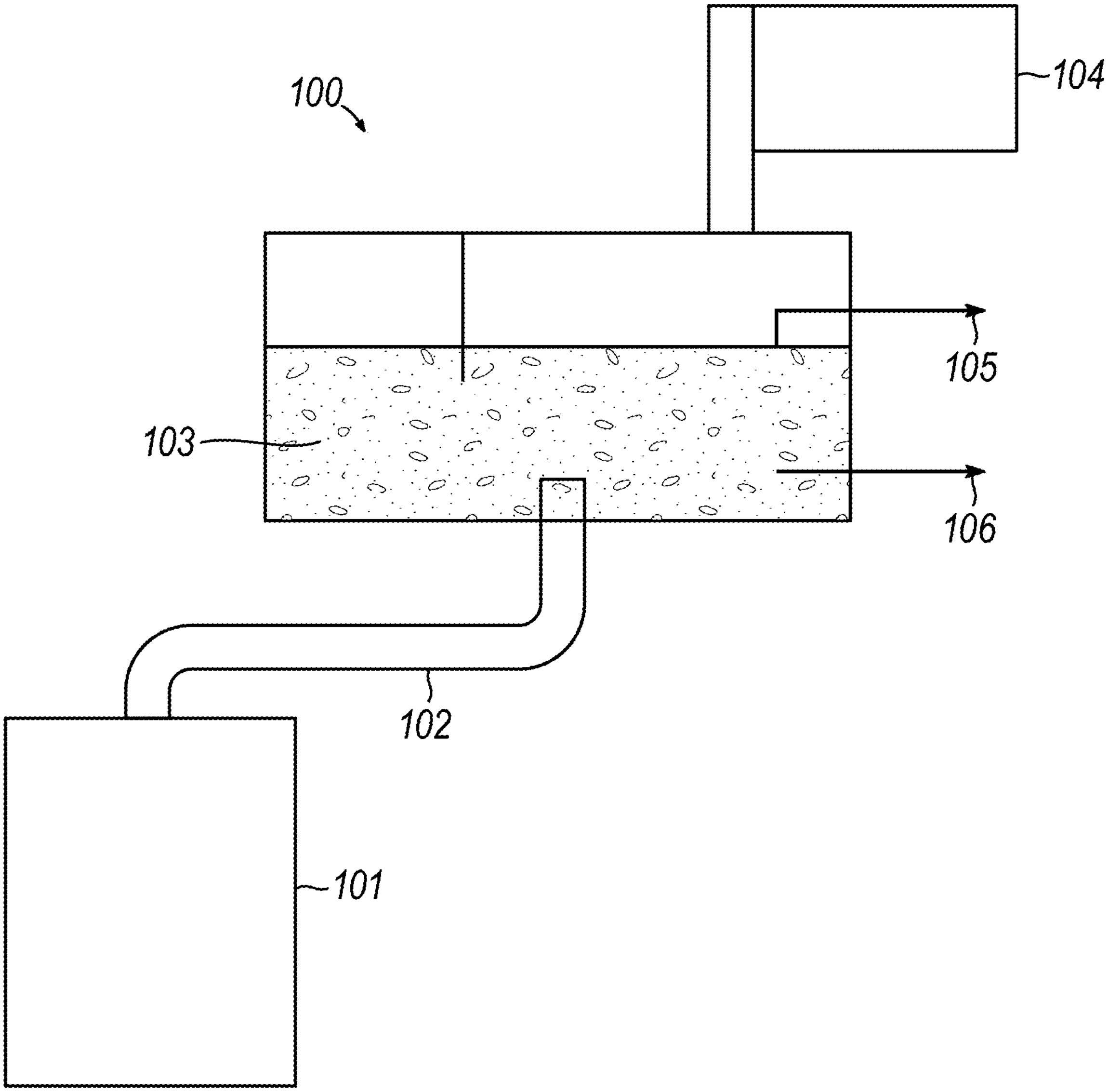
FIG. 1 shows a basic process flow and system embodiment.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

There currently exist certain challenges in the field of graphene, graphite and carbon allotrope synthesis, as identified above. There continues to be a need for the development of alternative processes for producing carbon nanostructures (e.g., graphene, carbon nanotubes, etc.), and synthetic graphene under conditions applicable to an industrial scale using unrecyclable carbon and metals.

Certain aspects of the disclosure and their embodiments may provide solutions to these or other challenges. The present disclosure provides various processes and systems to recycle plastics, electronics, munitions, coal, coke or propellants and/or produce graphene, graphite and other carbon allotropes. Various embodiments may utilize a molten aluminum or molten aluminum alloy bath. Certain embodiments utilize a molten aluminum bath as the reactant. The ground feedstock may be introduced below the surface of the molten aluminum bath and react with the aluminum to decompose the feed stock. In the process, elemental carbon, sulfur, copper, iron, and rare earth and heavy metals and molecular hydrogen, nitrogen, methane, and other hydrocarbons can be removed from the molten bath. The products can be sold and the nitrogen is either vented to the atmosphere or captured.

Certain embodiments may provide one or more of the following technical advantages. Advantages can include (re)capture of a variety of materials, all of which can be reused and/or sold. This can make the described embodiments a truly "green" and zero waste solution.

Some of the embodiments contemplated herein will now be described more fully with reference to the accompanying drawings. Embodiments are provided by way of example to convey the scope of the subject matter to those skilled in the art.

Certain embodiments utilize a molten metal as the primary reactant, such as aluminum or an aluminum alloy bath. The aluminum can also be alloyed with other elements including, but not limited to, zinc, iron, copper, silicon and calcium. Other metals and metal alloys such as calcium and silicon are also envisioned. The flue gas stream, which contains oxygen containing greenhouse gases produced by combustion processes, is passed through the aluminum alloy bath to remove the oxygen-containing gases from the flue gas stream.

In the process, excess heat can be generated and can be used to facilitate other processes such as cogeneration of power. The excess heat generated by the process is a function of the makeup of the carbon precursor feedstock or gases in the feed.

When the feed stock contains other compounds, those compounds can also be decomposed or captured. For example, if the feed stock contains inorganic compounds, such as chlorine, the process will produce an aluminum salt, in this case aluminum chloride. The present disclosure also provides methods and systems for capturing heavy metals, such as, but not limited to mercury or rare earth metals, which are often found in consumer electronics or munitions. In the process, the molten metal bath breaks down the metal compounds as they are introduced into the molten metal bath. As additional aluminum is added to the bath, the heavy metals settle to the bottom of the reaction vessels and are removed from the reaction vessel. While some aluminum may be entrained in the heavy metals that are removed from the bottom of the reaction vessel, the aluminum can be removed and refined and the heavy metals can be captured.

FIG. 1 shows one possible embodiment 100 under the present disclosure. In the basic process, ground material is introduced below the surface of the molten metal bath 103 using an injection feed system 101 through feed line 102. The elemental material, such as carbon, sulfur and the like, is captured 104, less dense secondary compounds are removed from the surface of bath 105, and denser secondary compounds are removed from the bottom of the bath 106. While this has been described as a method to recycle plastics, electronics, munitions or propellants, use of this method to recycle other organic compounds, such as, but not limited to rubbers, coal, coke, oils and tars are also contemplated.

Figure 2:
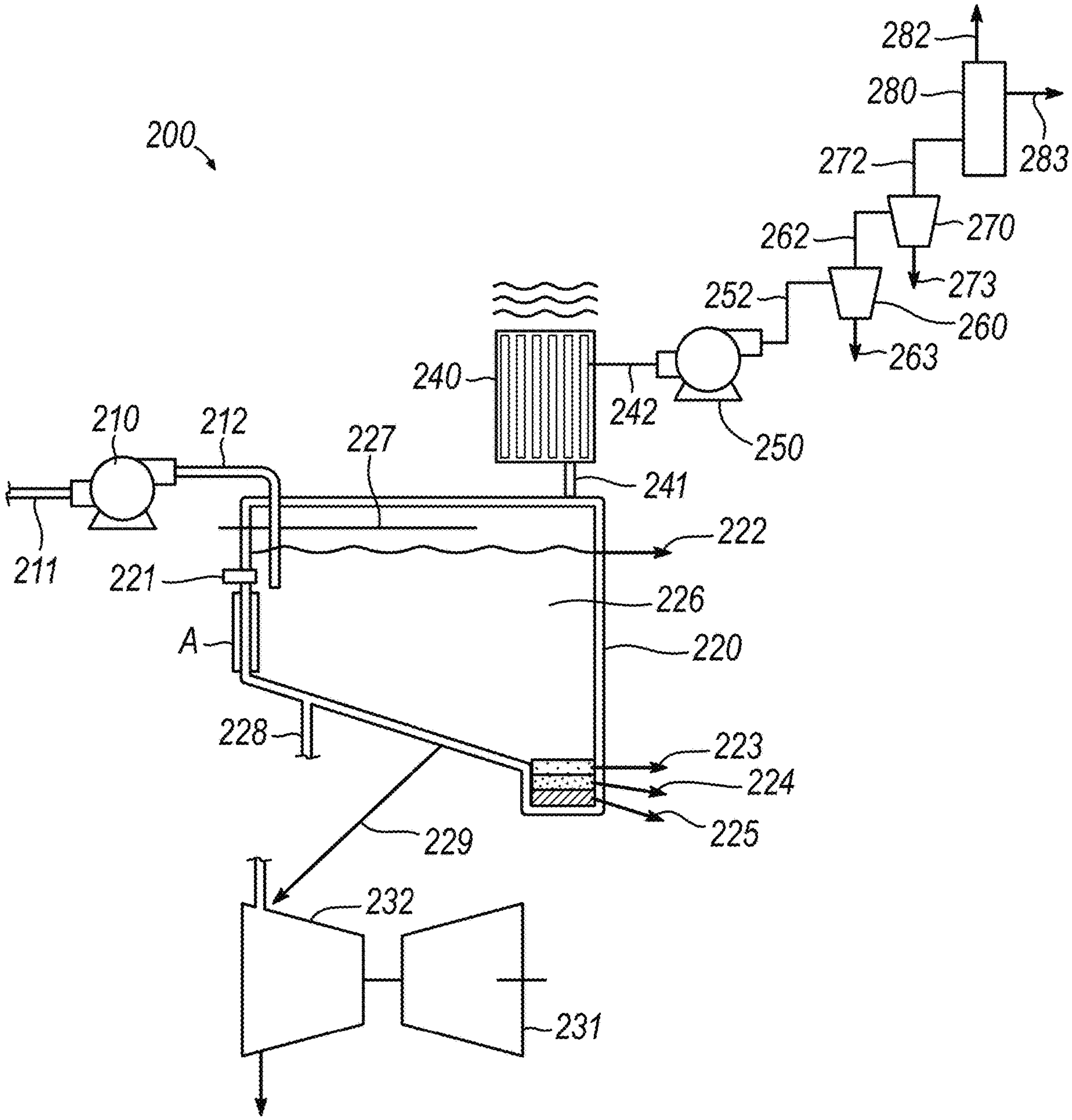
FIG. 2 illustrates a reaction vessel embodiment under the present disclosure.

FIG. 2 shows a further possible process flow embodiment 200. While the process described discusses processing recycling plastics, electronics, munitions, propellants, and other materials can be processed. The ground feed stock is introduced into the treatment process through blower feed line 211. Blower 210, which may be another type of injector, is used to inject the ground feed stock into reaction vessel 220 through injection line 212. Injection line 212 introduces the ground feed stock, which is entrained in an inert gas such as nitrogen, or an active gas such as but not limited to Hydrogen, propylene, natural gas, below the surface of the molten aluminum compound 226. Injection line 212 must be sufficiently below the surface of the molten aluminum compound 226 to allow for sufficient mixing. The heavy products of the reaction, typically the heavy metals described above will settle out in the reaction vessel. The reaction vessel typically has a sloped bottom, however other designs such conical bottoms and the like can be utilized. Once the heavy products settle out, they are collected using is a collection line from the top, a pump or collection lines 223, 224, and 225. Collection lines 223, 224, and 225 allow for heavy metals of different densities to be removed. Depending on the size of the process, the heavy products can be continuously removed or a batch removal process can be used.

Reaction vessel 220 also includes an aluminum feed line 221, which is used to supply additional aluminum compound to replace that consumed by the reaction with the ground feed stock. Additional heat may be required during start-up, for example. Heater 227 is provided for this purpose. Heater 227 can be any type of heater, including radiative, inductive, and convective. For example, heater 227 would be a microwave heater or a radio frequency heater wherein the frequency is tuned for the metal alloy used.

Figure 3:
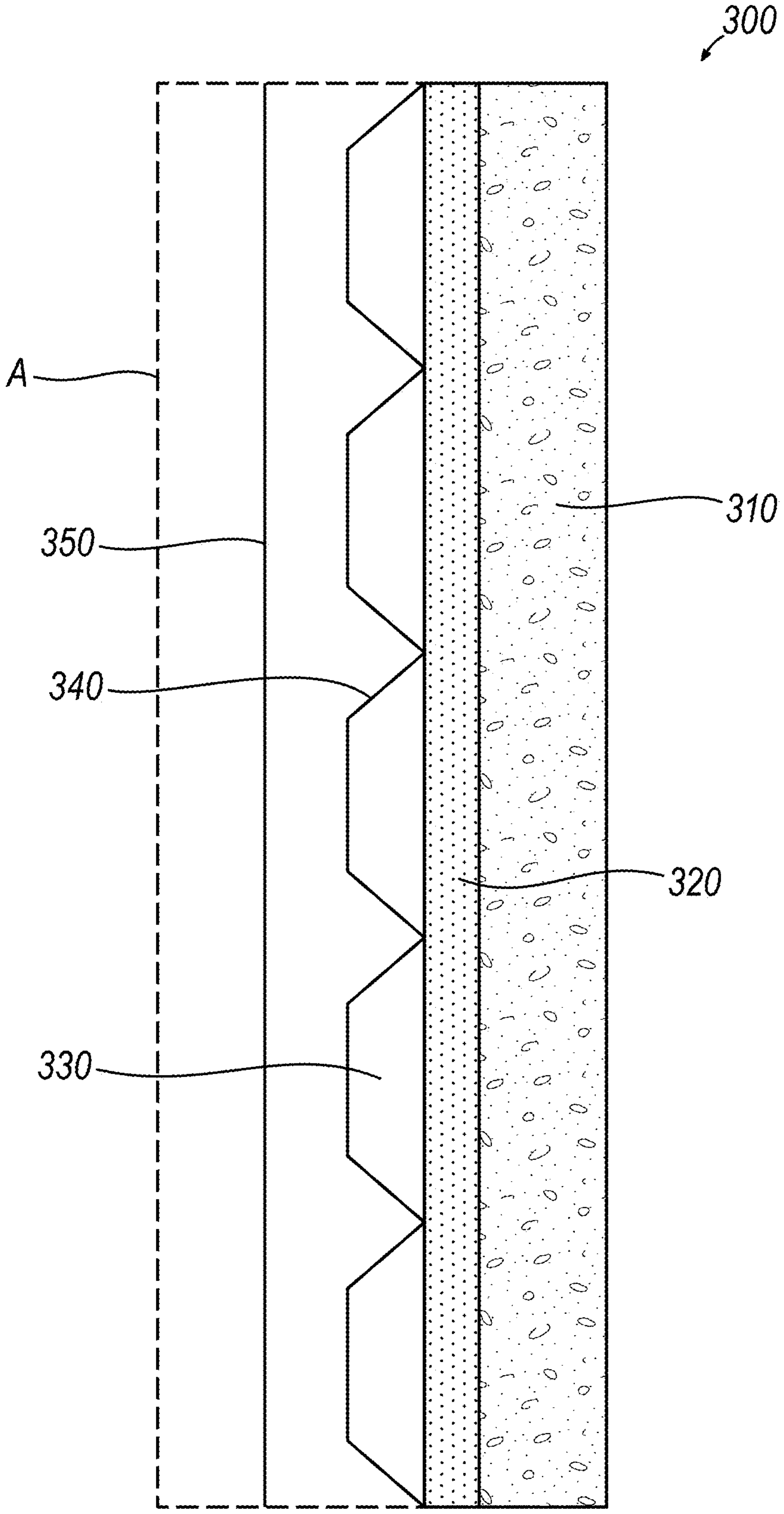
FIG. 3 shows a detailed cross sectional view of the reaction vessel wall.

The heat generated by the process is preferably removed. Section A, which is shown in more detail in FIG. 3, shows one way the heat can be removed from the process. The reaction vessel 220 is lined with a refractory material 310, which protects the vessel wall 320. Cooling plate 330 is attached to the vessel wall 320 and cooling media (e.g., air, water, other fluid) is circulated in the channels created between the cooling plant 330 and the vessel wall 320. Insulation 340 surrounds the cooling plate to maximize heat recovery, as well as for safety purposes. Once the cooling water picks up the heat generated from the process, it can be either sent to a cooling tower or the heat can be recovered and used for other purposes. If the process is used in a facility that needs a hot water source, then the heat recovery system can be designed for this purpose. However, the heat can also be used to generate electricity.

Turning back to FIG. 2, a steam turbine electric generation process is represented. In this case, the cooling water is introduced thorough cooling feed 228. As the cooling water travels around the reaction vessel 220, it picks up heat and steam is generated. The steam generated is then sent via steam line 229 to steam turbine 232. The steam passes through the turbine and as it condenses, turns the turbine blades of turbine 232. Turbine 232 is coupled to generator 231. As the turbine turns the rotor of generator 231 though the stator, it generates electricity. While this process is only briefly described, this steam turbine-electric generator process is well known in the art. And any steam turbine-electric generator process could be utilized.

Also, as described above, the reaction can also produce elemental carbon, elemental sulfur, molecular nitrogen and molecular hydrogen, or other materials. These can be removed from the reaction vessel using blower 250. Blower 250 can e.g., pull high temperature elemental carbon, elemental sulfur, molecular nitrogen and molecular hydrogen from the reaction vessel 220 through heat exchanger feed line 241 into heat exchanger 240. Heat exchanger 240 will then cool this material to enable further processing. Any hydrocarbons that are produced may also be condensed in heat exchanger 240. These liquid hydrocarbons can be collected for further use or sale. Heat exchanger 240 can be any heat exchanger, however in the preferred embodiment, heat exchanger 240 is a forced air heat exchanger, however other heat exchangers, are also envisioned. The process stream then leaves the heat exchanger through line 242 and passes through blower 250 and blower discharge line 252 into two cyclone separators. The first separator 260 separates out carbon from process stream. The carbon is collected though separation line 263. The remaining process stream proceeds to the second separator 270, which separates out sulfur from the process stream. The sulfur may be removed using a cold finger as the stream is cooled to less than 444 degrees Celsius. The sulfur is collected through separation line 273. The remaining process stream, which may include gaseous nitrogen and hydrogen, is then separated in cryo unit 280. In this unit, the gas stream is cooled further and to allow the components to be separated.

Below is a limited list of possible ground feed stock that may be recycled, and the resulting elemental outputs produced by the reactions within the molten metal bath.

| |
|---|
| Poly Vinyl Chloride: 2(C2H3Cl)n→4C + 3H2 + 2Cl |
| Polypropylene: (C3H6)n→3C + 3H2 |
| PET: (C10H8O4)n→10C + 4H2 + 2O2 |
| Polycarbonate: (C16H14O3)n→16C + 7H2 + 30O2 |
| ABS: (C8H8*C4H6*C3H3N)n→15C + 17/2H2 + 1N |
| 4-(tert-butyl)styrene (butyl styrene): (CH3)3C6H4CH═CH2→12C + 8H2 |
| Nylon 66: (C12H22N2O2)n→12C + 11H2 + 2N + 2O2 |
| Dibutyl Phthalate: 3C16H22O4 + 8Al═48C + 33H2 + 4Al2O3 |
| Diphenylamine: 2C12H11N + 0Al═24C + 22H2 + N2 |
| Nitrocellulose: |
| 6C6H9(NO2)O5 + 12Al═36C + 27H2 + 3N2 + 6Al2O3 |
| 2C6H9(NO2)2O5 + 12Al═12C + 9H2 + N2 + 6Al2O3 |
| 6C6H9(NO2)3O544Al═36C + 27H2 + 9N2 + 22Al2O3 |
| Dinitrotoluene: 3C7H6N2O4 + 8Al═21C + 9H2 + 3N2 + 4Al2O3 |

Figure 4:
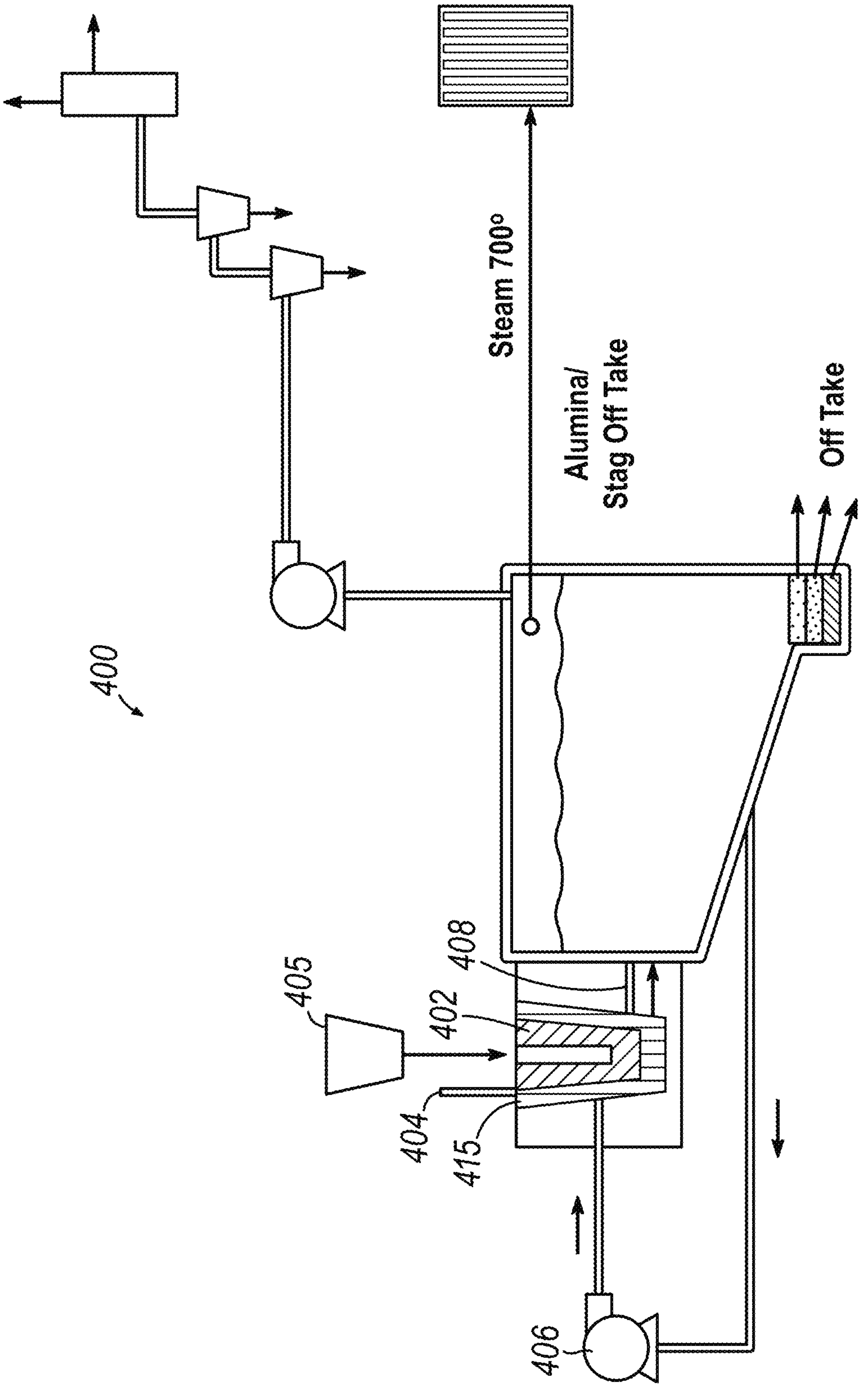
FIG. 4 shows a modified reaction vessel embodiment incorporating a vortex.

FIG. 4 illustrates another possible embodiment. FIG. 4 shows a modified process flow 400 using a vortex entry. As with the process described in FIG. 2, the modified process enables recycling of e.g., plastics, electronics, coal, coke, munitions or propellants. Instead of being directly injected into the aluminum bath, the ground feed stock is introduced into the treatment process through line fed by a vortex 402. The vortex 402 is formed within a ceramic bowl 415 by pumping in molten aluminum or aluminum alloy. The molten aluminum or aluminum alloy may be added through a new aluminum input line 404, or it may be recirculated from the aluminum bath using a pump 406. The ground feed stock (which may include any of the materials above that need to be recycled) may then be introduced into the ceramic bowl 415 through a gravity feed 405. The ground feed stock mixes with the molten aluminum or aluminum alloy and the mixture is pulled to the bottom of the bowl from the rotation of the vortex 402. The bottom of the ceramic bowl 415 may have a connecting line 408 to the aluminum bath, and the mixture of ground feed stock and molten aluminum or aluminum alloy enters the aluminum bath from the connecting line 408. Other aspects of the modified process flow 400 are similar to that shown with the flow in FIG. 2.

The vortex entry illustrated in FIG. 4 allows for some benefits over other injection systems. The vortex allows better mixing of the ground feed stock with the molten aluminum or aluminum alloy, which allows the recycling reactions to occur more efficiently. Additionally, because the ground feed stock has already mixed with the molten aluminum in the ceramic bowl 415, the temperature of the mixture has an opportunity to equalize, and the temperature may be relatively close to the temperature of the molten aluminum within the bath. Accordingly, there is less localized cooling, and a more consistent temperature gradient, at the entry injection point when the vortex entry is used.

As described above, once the feed stock enters the aluminum bath or the vortex, then reactions of the ground feed stock material with the aluminum or aluminum alloy bath will begin. The denser materials will begin to settle while the lighter materials will rise. The lightest materials, such as gas will bubble to the surface, to be recovered there.

Other embodiments under the present disclosure can focus on the production of graphene, such as carbon nanostructures and synthetic graphite. One synthesis method to manufacture graphene can be defined by mixing between an unrecyclable carbon precursor with a catalyst in a controlled oxygen free environment. The reaction is carried-out at a range from about 600° C. to 1400° C. The apparatus or system used can be similar to those illustrated in FIG. 1, 2 or 4. Such embodiments may be defined by the decomposition of the carbon precursor in carbon, hydrogen, and oxygen atoms. The later only if available in the precursor. Such processes may include epitaxial assembly of the carbon atoms on the surface of the liquid aluminum. A doping process may occur as result of presence of oxygen during the graphene synthesis.

To assess various approaches to graphene synthesis, and to increase the graphitization levels, some growths were carried-out applying various reaction times, and temperatures. Thus, the system may be designed to vary the residence time of the carbon precursor to allow for the synthesis of various graphite or graphene structures. Various different metal catalysts (e.g., Mg, Fe, Co) can be added to the catalyst to aid in the synthesis of the different carbon allotropes. Embodiments of the reactor (e.g., of FIGS. 2 and 4) are currently designed to operate at relatively low pressures of about 3-5 psi gauge. It is envisioned that the reactor may be run at higher pressure up to several atmospheres. A carrier gas may or may not be used during the process. This carrier gas can be any of the short chain hydrocarbons, nitrogen, or hydrogen. An inert gas may or may not be used during the process. Currently nitrogen is used in some example embodiments as an inert gas, but argon or the other inert gases can be used. Hydrogen may or may not be a byproduct of the reaction. Further micronization, pulverizing or jet milling might be used to fine process any product materials and outputs.

Other methods might be used to functionalize the produced carbon. A combination of waste metals (e.g., Mg, Fe, Co, etc.) may be applied as secondary catalysts in some embodiments. The synthesis of carbon nanostructures and synthetic graphite may occur while recycling other metals. In certain embodiments, the synthesis of carbon nanostructures and synthetic graphite may occur in presence of chalcogenides (e.g., oxygen, sulfur, selenium, tellurium).

Several experiments were conducted to assess the graphene producing capabilities of certain embodiments. Several samples were prepared according with Table 1, below.

TABLE 1

| Sample prepared | Carbon source | Temperature range (° C.) | Carbon material obtained |
|---|---|---|---|
| ER-01 | Plastic waste mix | 900-950 | Graphene, few-layered graphene |
| ER-02 | Natural gas | 900-1100 | Sulfur-Graphene |
| ER-03 | HDPE* | 900-930 | Highly Oriented Pyrolytic Graphite like (HOPG)** |

*HDPE = High density polyethylene

**synthetic graphite that mimics the natural type as well as HOPG.

Example 1—Synthesis of Graphene Using Plastic Waste (Sample ER-01)

For Example 1, a mix of unrecyclable grinded plastic waste was inserted into the reactor with an aluminum alloy. An inert gas (e.g., nitrogen) was used as carrier to transport the graphene from the reaction chamber to the collecting container. The temperature range at the reaction chamber was kept between 600° C. to 950° C. The sample ER-01 included unrecyclable plastics (e.g., HDPE, PET, PP, Styrene, PVC) and tires (waste plastics). These served as a carbon precursor and aluminum alloys were used as catalyst.

Figure 5A:
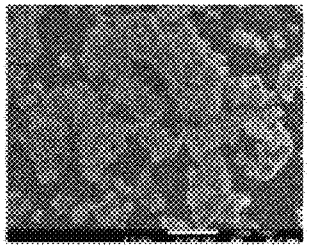
FIGS. 5A-5N show SEM images of the sample (ER-01) treated at 900-950° C. using unrecyclable plastics (HDPE, PET, PP, Styrene, PVC) and tires (waste plastics) as a carbon precursor and aluminum alloys as catalyst.
Figure 5B:
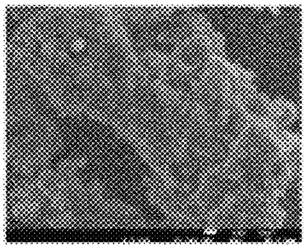
Figure 5C:
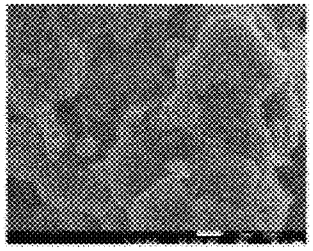
Figure 5D:
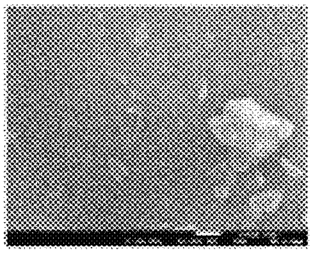
Figure 5E:
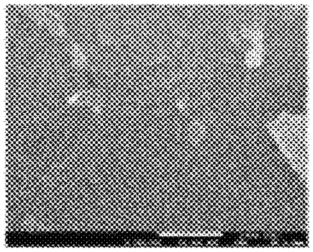
Figure 5F:
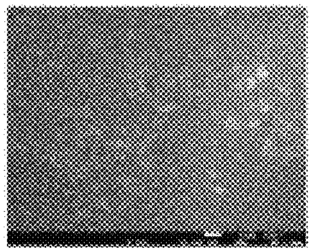
Figure 5G:
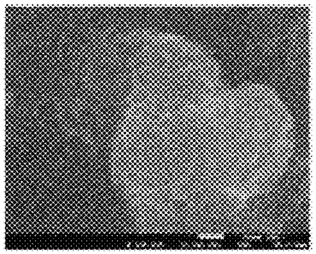
Figure 5H:
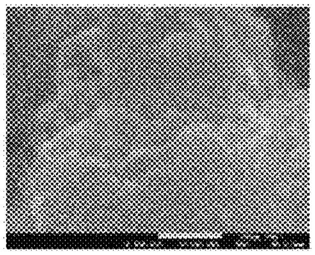
Figure 5I:
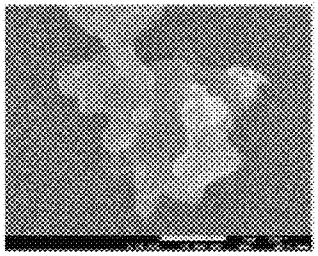
Figure 5J:
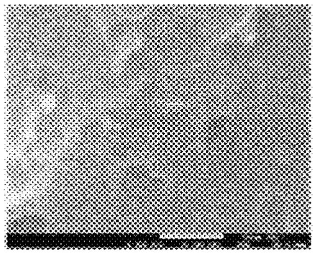
Figure 5K:
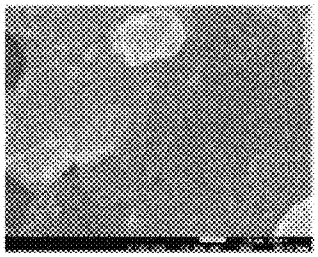
Figure 5L:
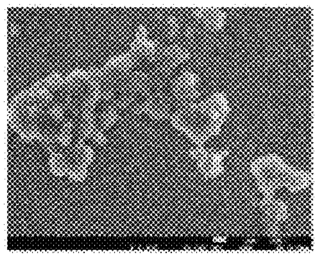
Figure 5M:
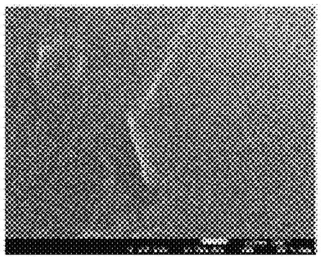
Figure 5N:
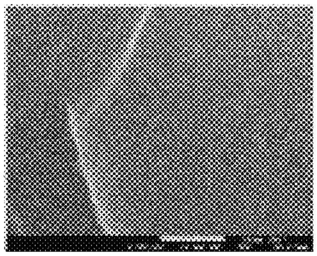

FIGS. 5A-5N show scanning electron microscopy (SEM) images of the sample ER-01 after manual grinding. The sample was dispersed in methanol, sonicated by an ultrasound bath for 5 minutes, and drop-casted on a Si/SiO2 wafer. The images show particles aggregates above 5 μm whereas higher resolution images (×250,000) show small flakes below 100 nm.

Figure 6A:
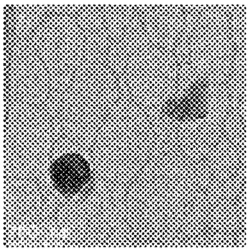
FIGS. 6A-6N show TEM images of the sample (ER-01) treated at 900-950° C. using unrecyclable plastics as carbon precursor and aluminum alloys as catalyst. Images (j) and (n) show diffraction results (SAED) of the graphene sheets.
Figure 6B:
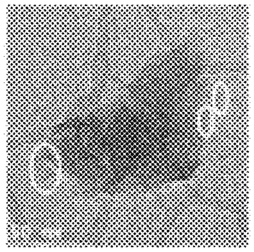
Figure 6C:
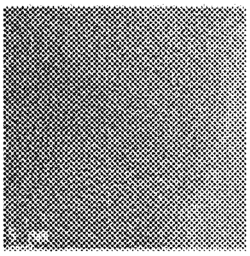
Figure 6D:
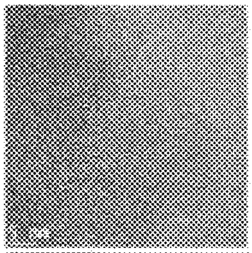
Figure 6E:
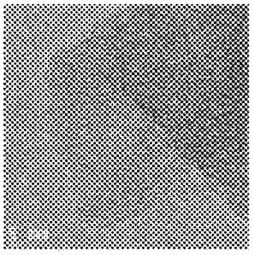
Figure 6F:
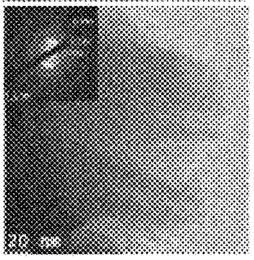
Figure 6G:
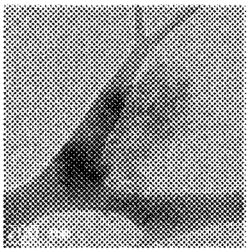
Figure 6H:
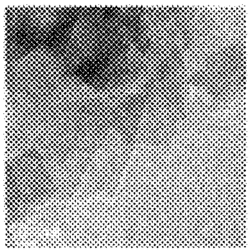
Figure 6I:
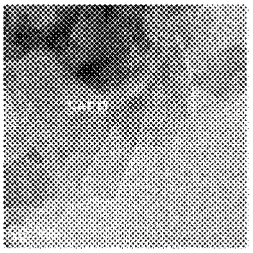
Figure 6J:
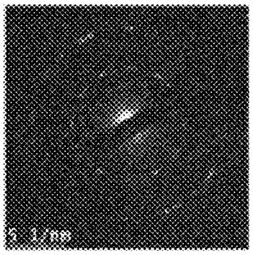
Figure 6K:
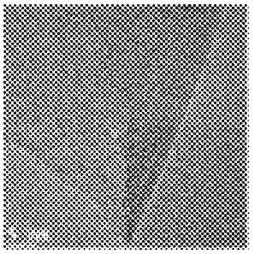
Figure 6L:
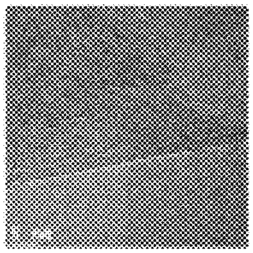
Figure 6M:
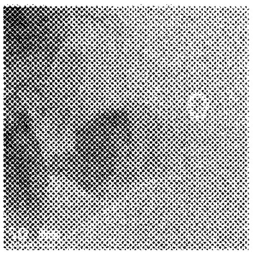
Figure 6N:
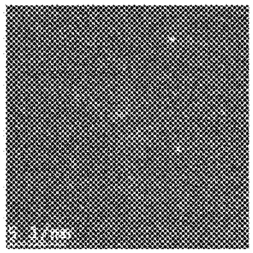

FIG. 6A-6N show transmission electron microscopy (TEM) images of graphene sheets and ribbons (ER-01) after dispersion in methanol for 10 minutes by ultrasonicating bath. A drop of the sample was deposited on a nickel TEM grid coated with lacey carbon. FIGS. 6A-6N show graphene flakes (images A-F) and sheets (images G-N). The graphene sheets have up to three turbostratic layers according with Selected Area Electron Diffraction SAED (images J, N).

Figure 7:
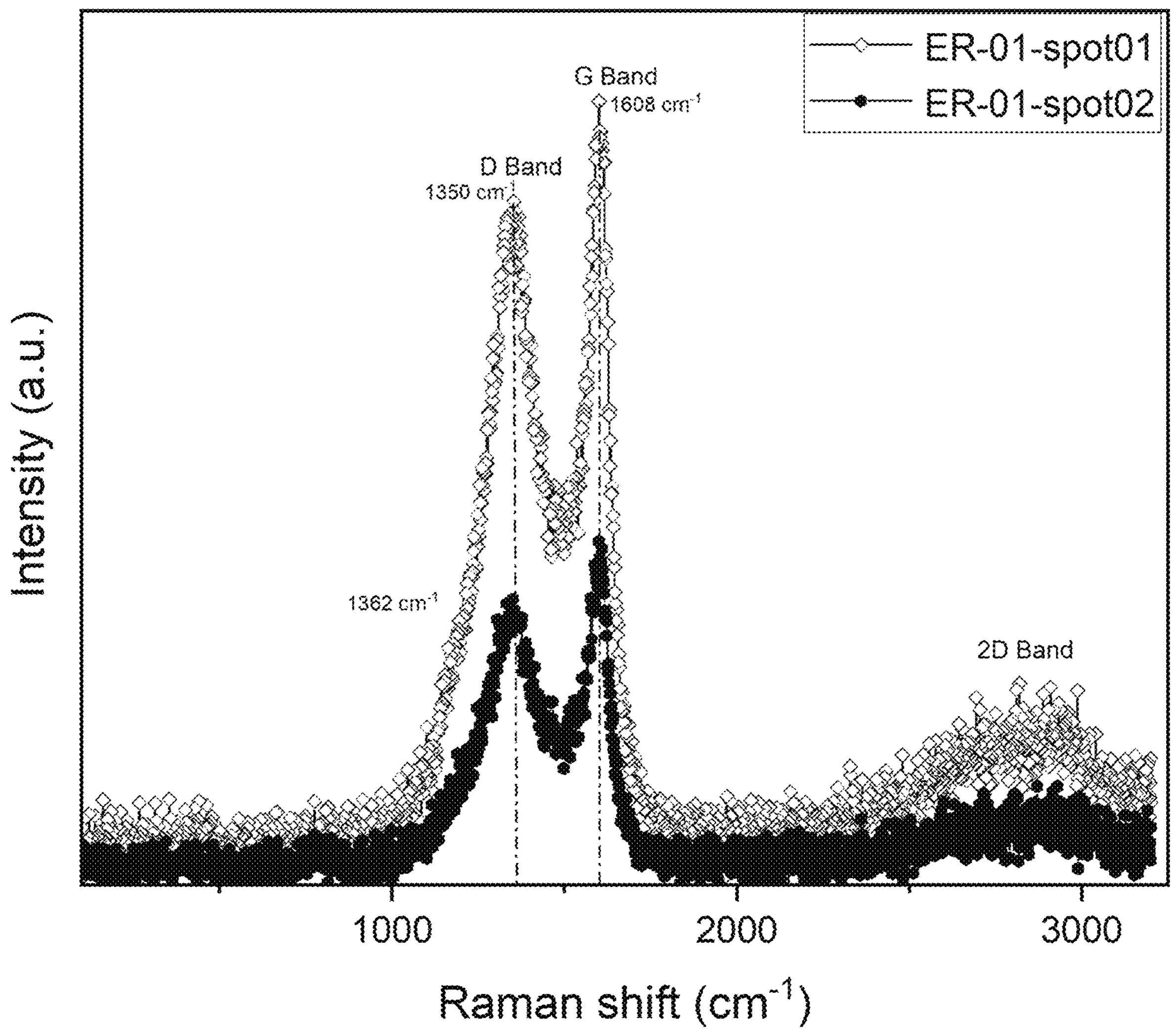
FIG. 7 shows a Raman spectra of sample ER-01 treated at 900-950° C. using waste plastic as carbon precursor and aluminum alloy as catalyst.

FIG. 7 shows Raman spectroscopy results of graphene (sample ER-01). The Raman spectra were acquired using a 532 nm laser line, acquisition time of 10 seconds, 10 to 15 acquisitions. The spectra show the D band at 1350 cm-1 and 1362 cm-1 which corresponds to the breathing mode of k point phonons of A1g symmetry. The D band arises from certain defects such as vacancies, grain boundaries, etc. The G band at 1608 cm-1 corresponds to the E2g phonon of the sp2 C atoms. The G/D ratio is 1.11. Two other bands were observed at 2700 and 2900 cm-1 which represent the 2D band and S3 band respectively. The S3 band is a second-order peak derived from the D-G peak combination. Likewise, the 2D band is observed to be broadened, attributed to the fact that the prepared graphene contains few layers with some defects.

Figure 8:
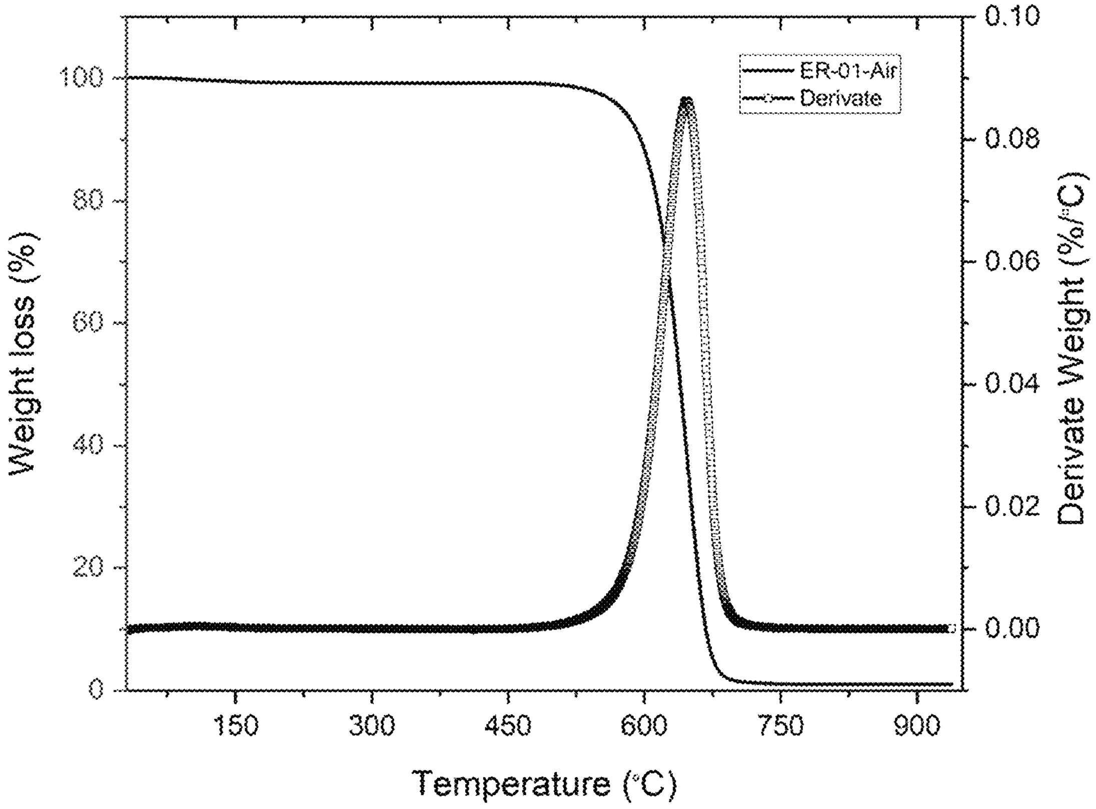
FIG. 8 shows Thermal Gravimetric (TGA) results of sample ER-01 in synthetic air.
Figure 9:
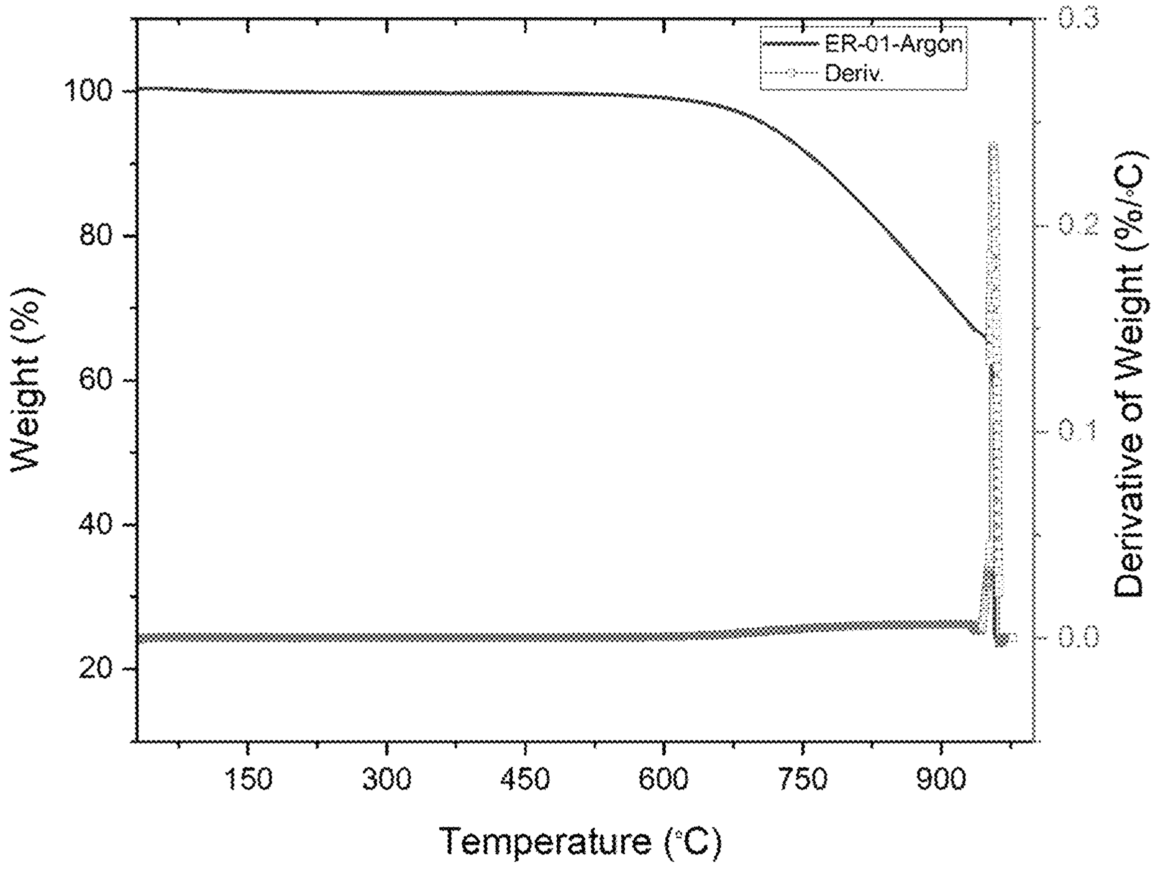
FIG. 9 shows TGA results of sample ER-01 in argon.

FIGS. 8 and 9 show thermal gravimetric analysis (ER-01) for air and argon. Thermal gravimetric analysis was performed using synthetic air, using ~4 mg ramp from 30° C. to 950° C., heating rate of 10° C./minute. One analysis was done in synthetic air while the other was done in argon. The lines in FIG. 8 show the thermal decomposition profile of graphene (sample ER-01) in air. The temperature of degradation of the graphene starts at about 550° C. whereas the complete degradation happens at about 700° C. There is almost total degradation of the sample. The line in FIG. 9 shows the thermal decomposition profile of graphene (sample ER-01) in argon. The temperature of degradation of the graphene starts at about 720° C. whereas the end of the degradation happens at about 950° C. There is a residue of 70% after the temperature treatment.

Figure 10:
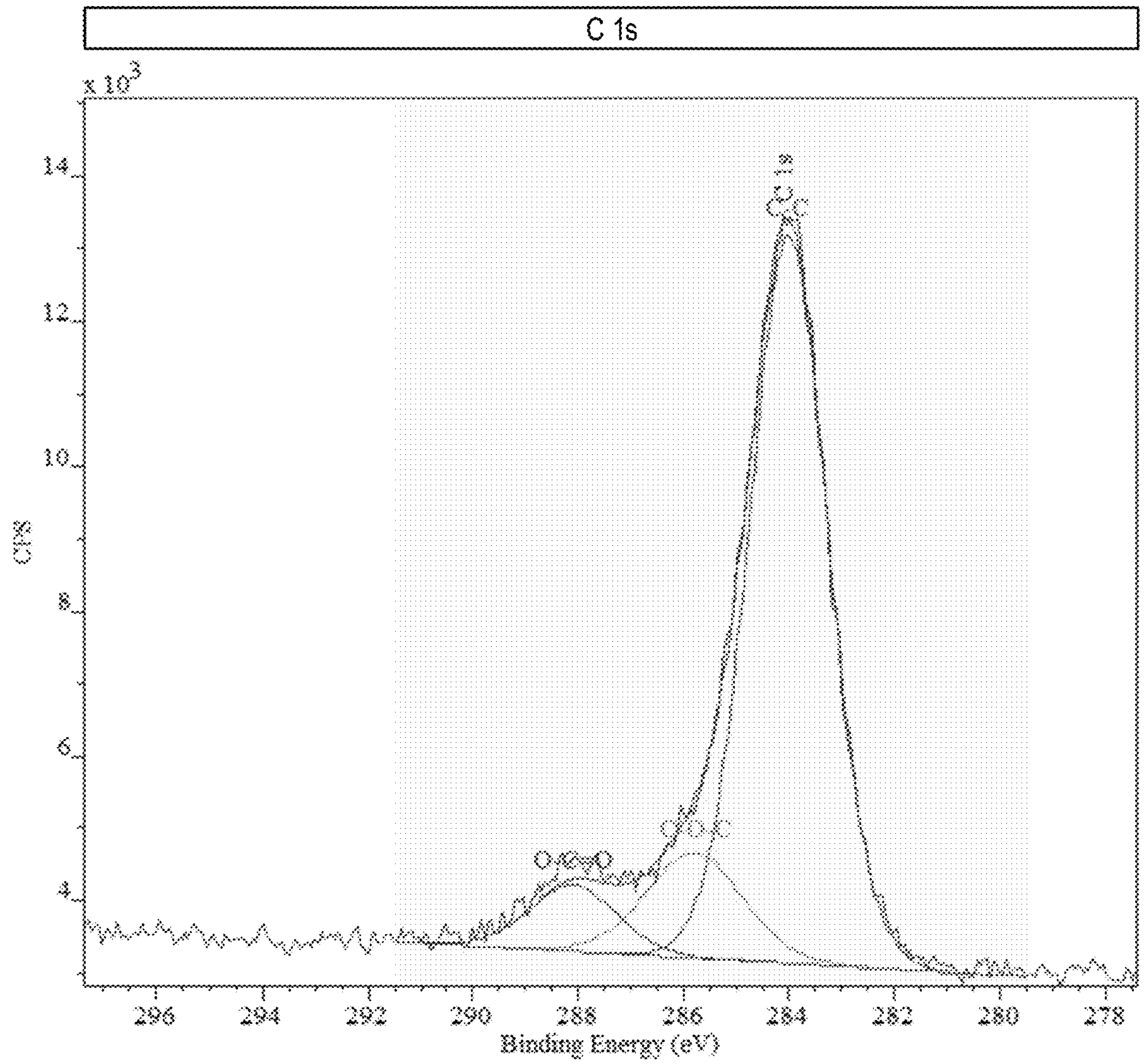
FIG. 10 shows XPS spectra of carbon for sample ER-01.
Figures 11A, 11B, 11C, 11D, 11E, 11F, 11G, 11H:
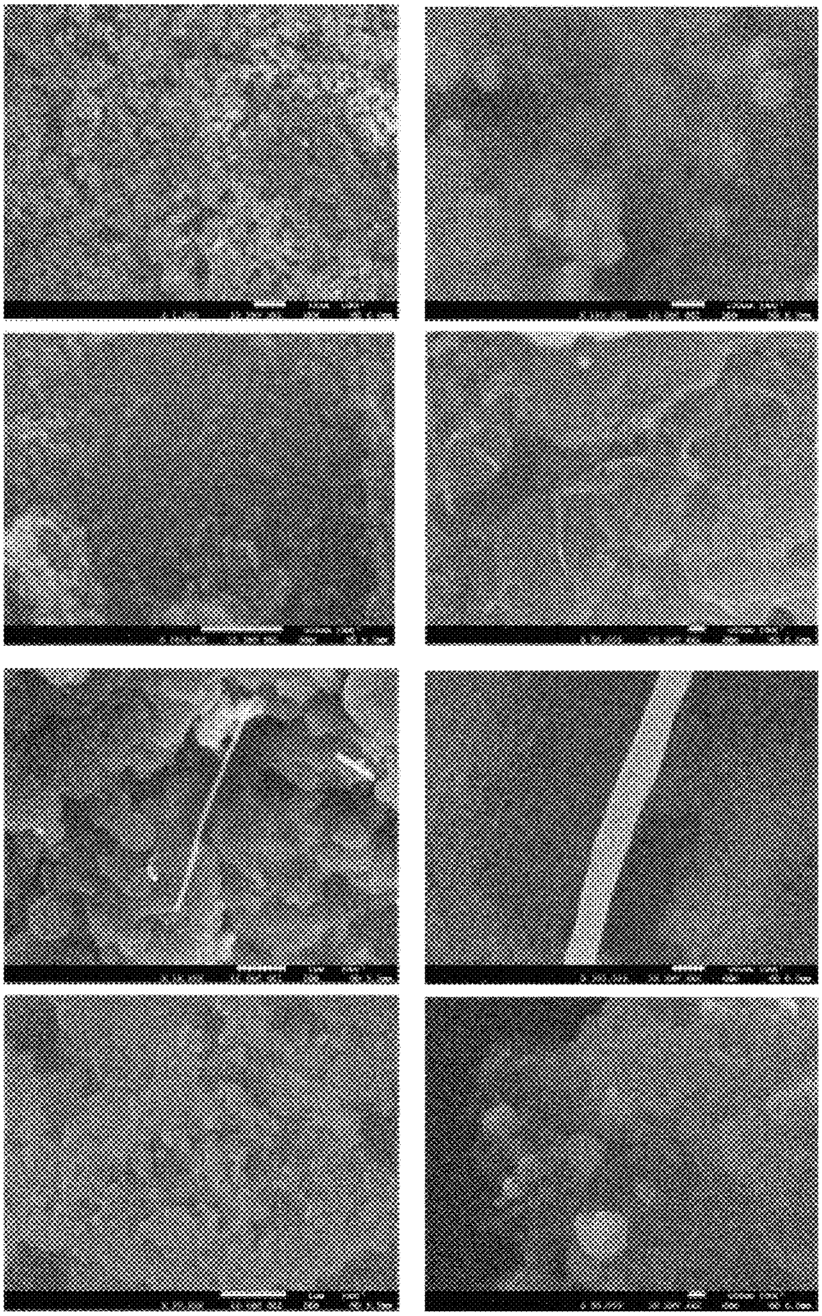
FIGS. 11A-11H show SEM images of the sample ER-02 treated at about 900-1100° C. using natural gas as carbon precursor and aluminum alloy as catalyst.

FIG. 10 shows the C 1s spectra with peaks at 284 eV, 286 eV, 288 eV which correspond to C—C, C—O—C, O—C═O bonds respectively.

Example 2—Synthesis of Sulfo-Graphene (Sample ER-02)

For Example 2, natural gas was inserted into the reactor with aluminum alloy. An inert gas (e.g., nitrogen) was used as carrier to transport the graphene functionalized with sulfur from the reaction chamber to the collecting container. The temperature range at the reaction chamber was kept between 900° C. to 1100° C. The total reaction time was 120 min. Variations of the synthesis regarding the temperature/reaction time are as it follows, initial 60 minutes at temperature range of 900° C. to 950° C., followed by a ramp up to ~1100° C. The material was kept at temperature plateau of ~990° C. to 1100° C. for 30 minutes. After that the temperature was kept between 900° C. to 920° C. for 30 minutes.

FIGS. 11A-11H show SEM images of sulfur-graphene flakes from sample ER-02. The sample was dispersed in methanol, sonicated by ultrasound bath for 5 minutes, and drop-casted on a Si/SiO2 wafer. The results show graphene flakes, and nanorods.

Figure 12:
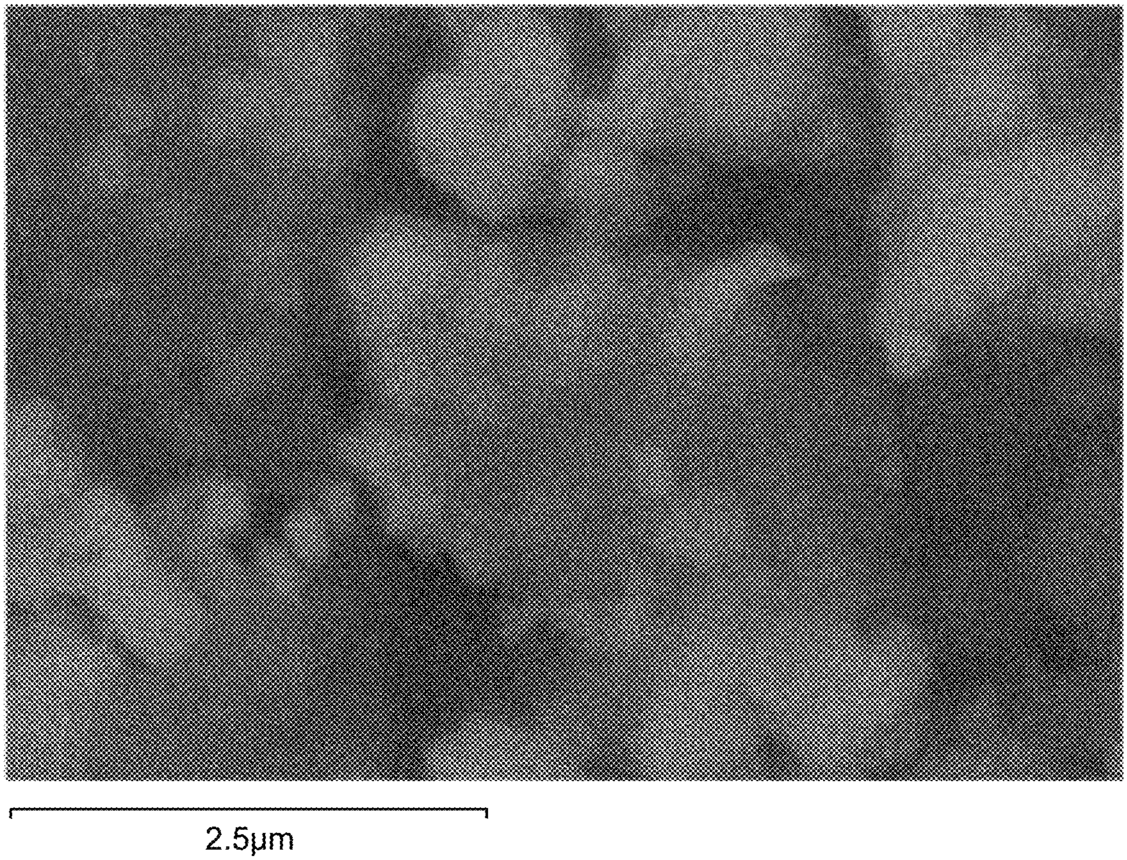
FIG. 12 shows SEM mapping images of the sample ER-02 treated at about 900-1100° C. using natural gas as carbon precursor and aluminum alloy as catalyst.
Figure 13A:
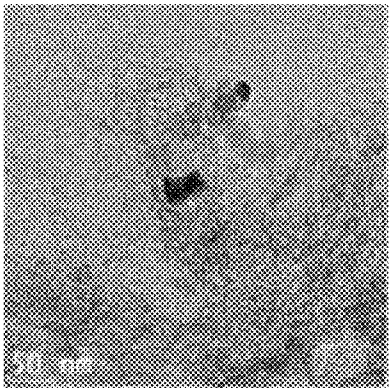
FIGS. 13A-13F show TEM images of the sample ER-02 treated at 900 to 1100° C. using natural gas as carbon precursor and an aluminum alloy as catalyst.
Figure 13B:
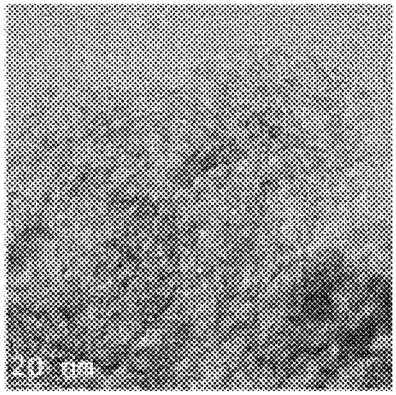
Figure 13C:
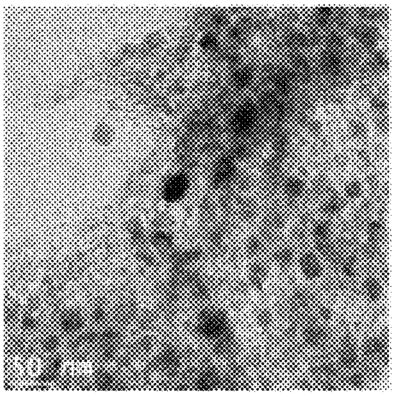
Figure 13D:
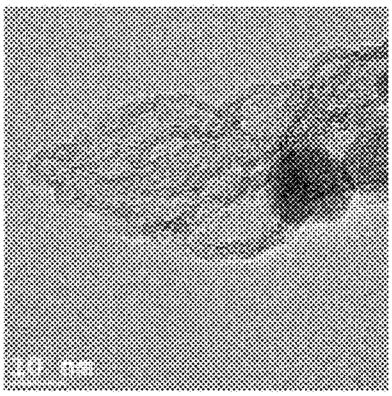
Figure 13E:
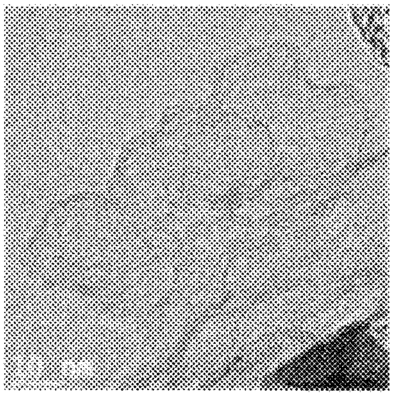
Figure 13F:
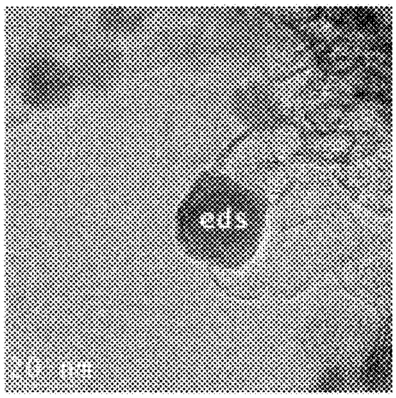

FIG. 12 shows SEM mapping images of sulfur-graphene flakes from sample ER-02. The sample was dispersed in methanol, sonicated by ultrasound bath for 5 minutes, and drop-casted on a Si/SiO2 wafer. The mapping was obtained according with the initial EDS spectrum of the area obtained from image 13A. FIG. 12 shows the image of the area for mapping.

FIGS. 13A-13F show TEM images of sulfur-graphene from sample ER-02. These TEM images of the sample ER-02 were collected after dispersion in methanol for 10 minutes by ultrasonicating bath for 10 minutes. A drop of the sample was deposited on a nickel TEM grid coated with lacey carbon. FIGS. 13A-13F show graphene flakes and small particles of carbon/sulfur.

Figure 14:
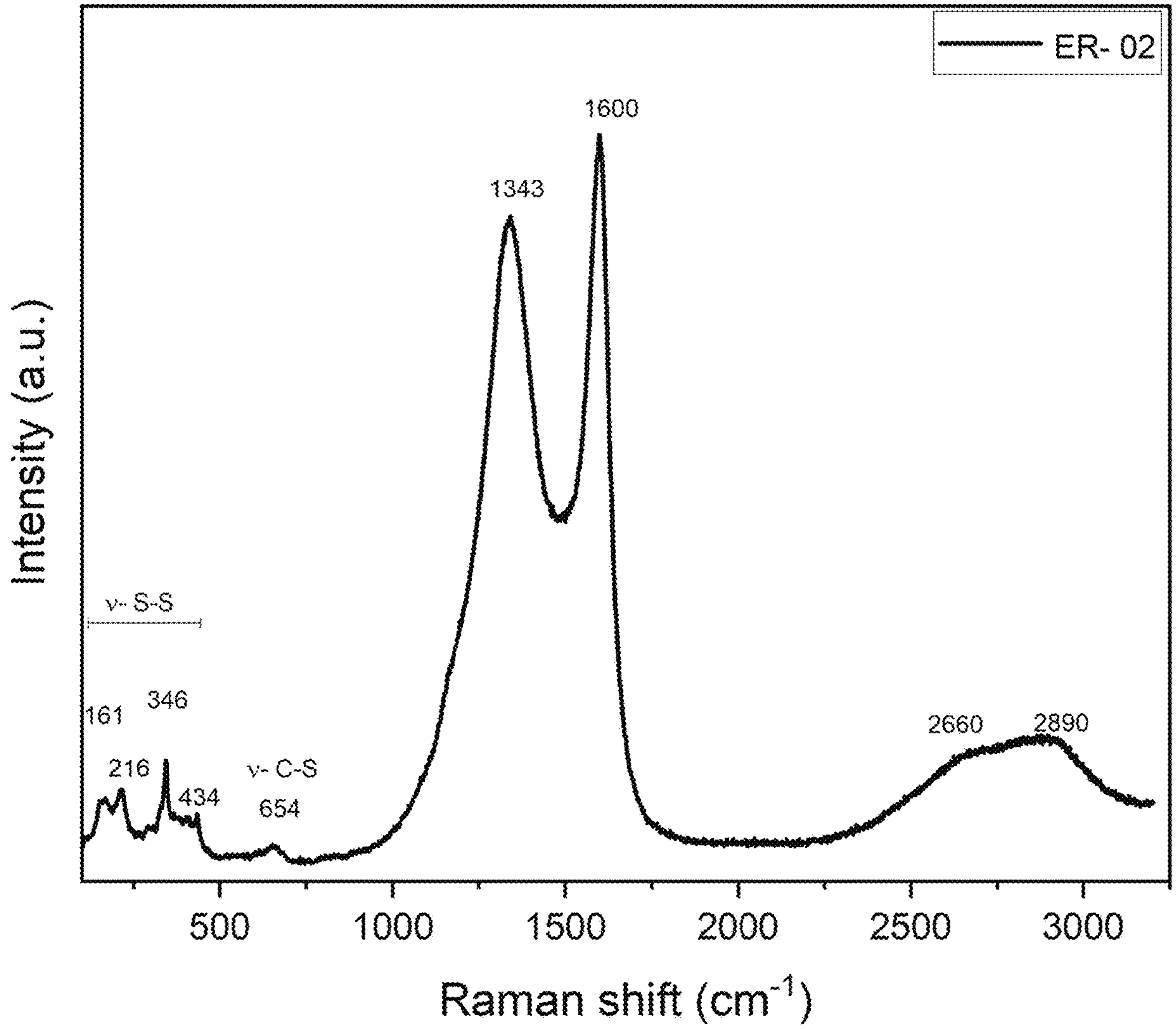
FIG. 14 shows a Raman spectrum of sample treated at about 900-1100° C. using natural gas as carbon precursor and aluminum alloy as catalyst.
Figure 15A:
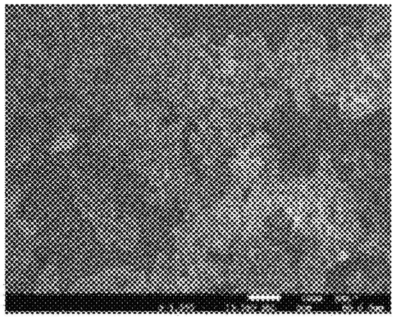
FIGS. 15A-15I show SEM images of the sample ER-03 treated at about 900-950° C. using HDPE as carbon precursor and aluminum alloy as catalyst.
Figure 15B:
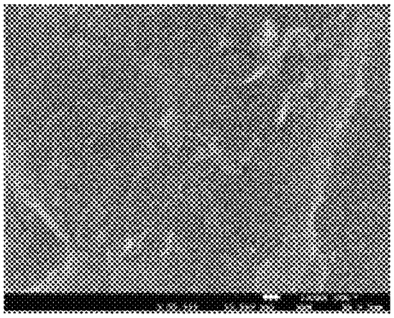
Figure 15C:
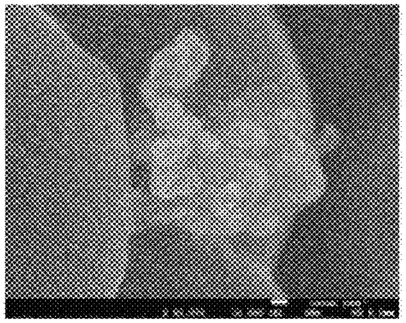
Figure 15D:
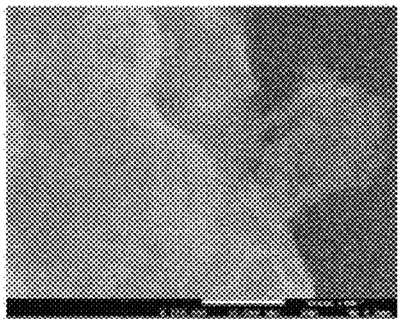
Figure 15E:
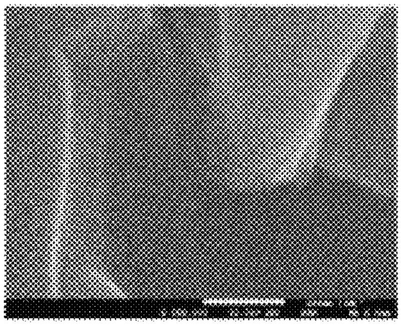
Figure 15F:
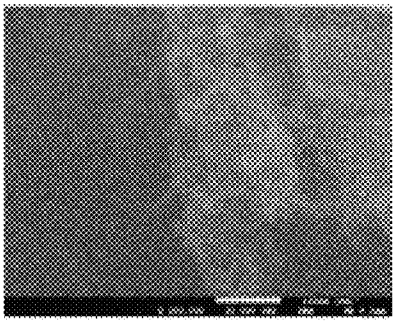
Figure 15G:
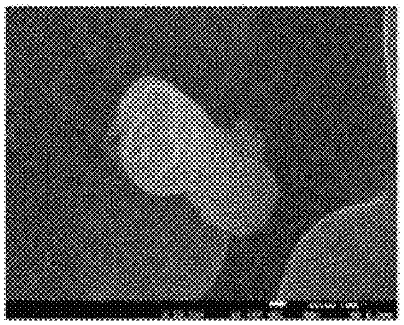
Figure 15H:
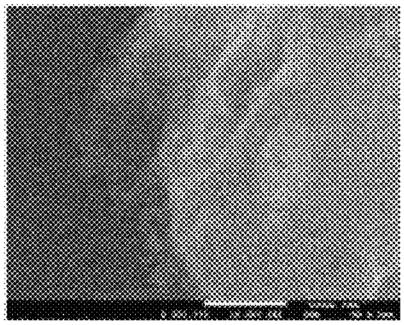
Figure 15I:
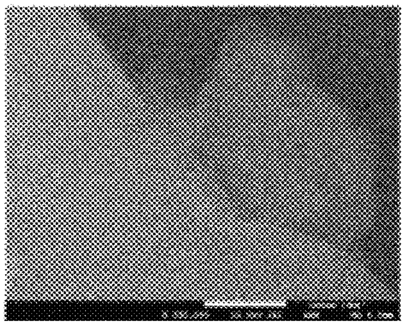

FIG. 14 shows Raman spectroscopy results of sulfur-graphene for sample ER-02. The Raman spectrum was acquired using a 532 nm laser line, acquisition time of 10 seconds, 10 to 15 acquisitions. The spectrum shows peaks from 161 cm-1 to 434 cm-1 which represent the contributions of stretching modes (v) related to —S—S—, polymerized —S—S—, as well as nanorods (ZnS?). The peak at 654 cm-1 represents (v) of —C—S— bond. The D band at 1343 cm-1 which corresponds to a shifted breathing mode of k point phonons of A1g symmetry. The D band arises from certain defects such as vacancies, grain boundaries, etc. The G band at 1600 cm-1 corresponds to the E2g phonon of the sp2 C atoms. Two other bands were observed at 2660 and 2890 cm-1 which represent the 2D band and S3 band respectively. The 2D band is observed to be broadened, attributed to the fact that the prepared graphene contains few layers with some defects.

Example 3—Synthesis of Highly Oriented Pyrolytic Graphite Like (Sample ER-03)

For Example 3, high density polyethylene (HDPE) was inserted into the reactor with aluminum alloy. An inert gas (e.g., nitrogen) was used as carrier to transport the highly oriented pyrolytic graphite (HOPG) like from the reaction chamber to the collecting container. The temperature range at the reaction chamber was kept between 900° C. to 950° C.

FIGS. 15A-15I show SEM images of highly oriented pyrolytic graphite (HOPG) like from sample ER-03. The sample was dispersed in methanol, sonicated by ultrasound bath for 5 minutes, and drop-casted on a Si/SiO2 wafer. The HOPG like material showed graphitic flakes embedded in round graphitic structures.

Figure 16:
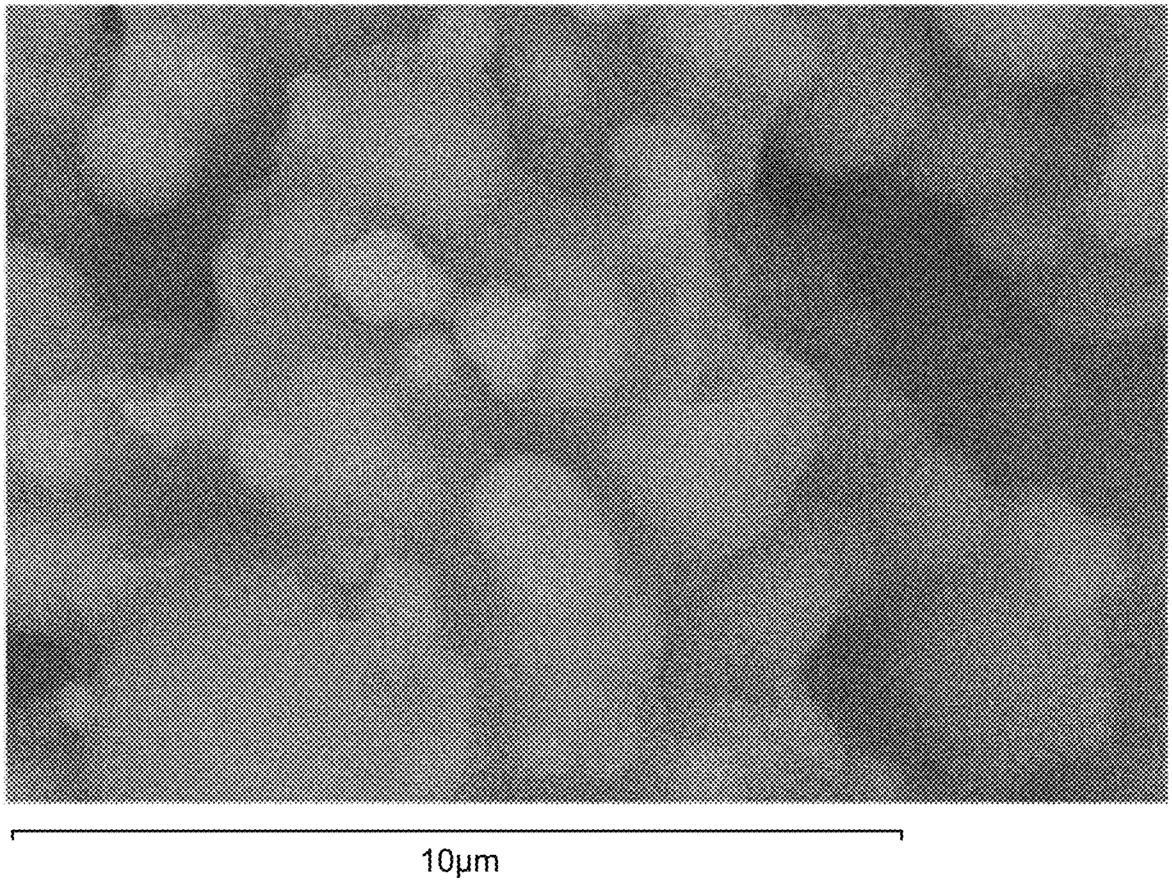
FIG. 16 shows SEM mapping of the sample ER-03 treated at about 900-950° C. using HDPE as carbon precursor and aluminum alloy as catalyst.
Figure 17:
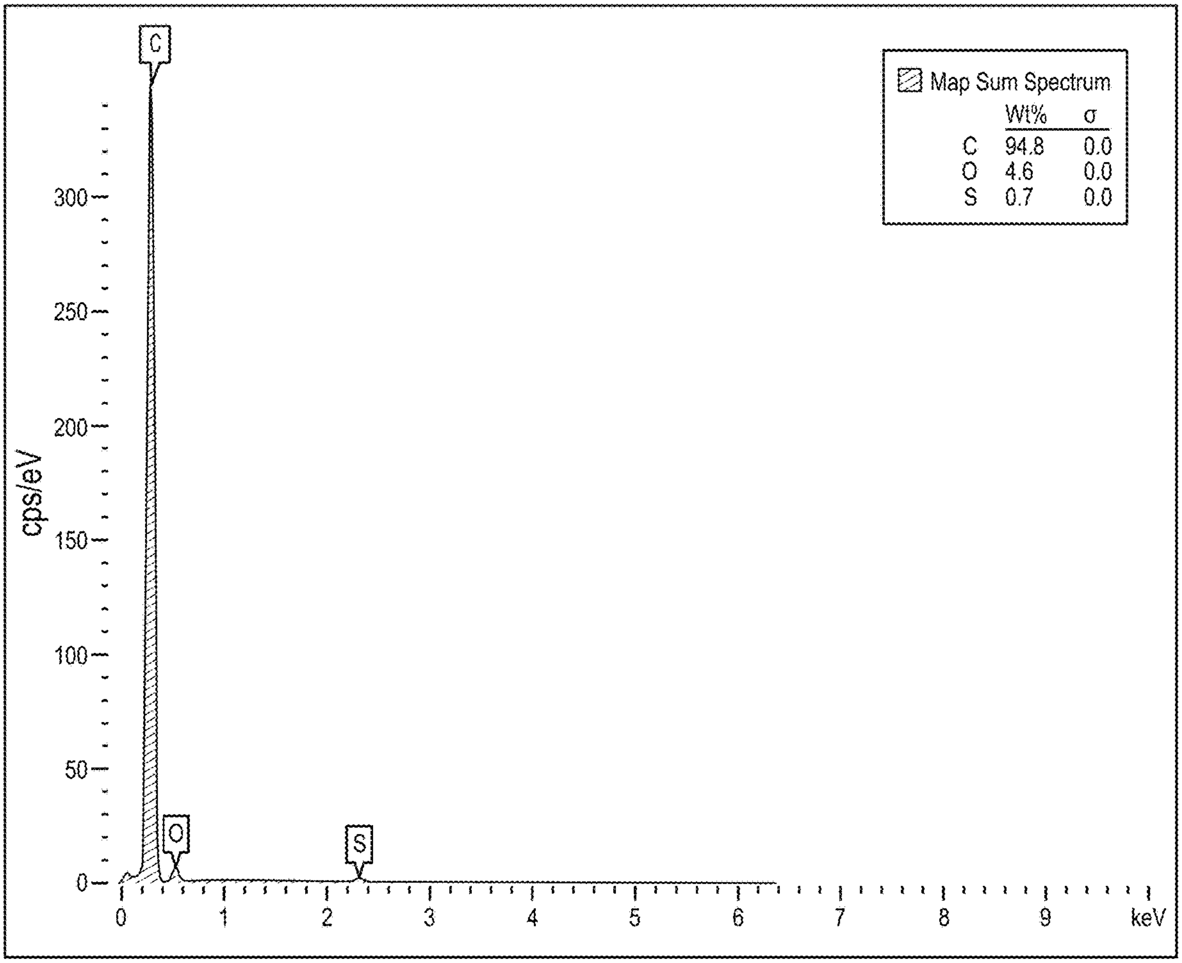
FIG. 17 shows the EDS spectrum of the analyzed area.
Figure 18A:
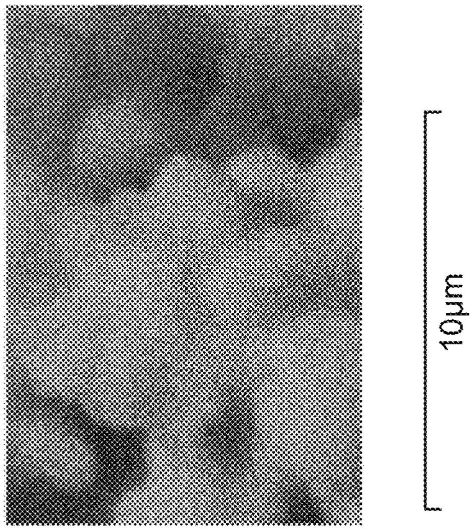
FIGS. 18A-18C represent the EDS mapping of carbon, oxygen, and sulfur.
Figure 18B:
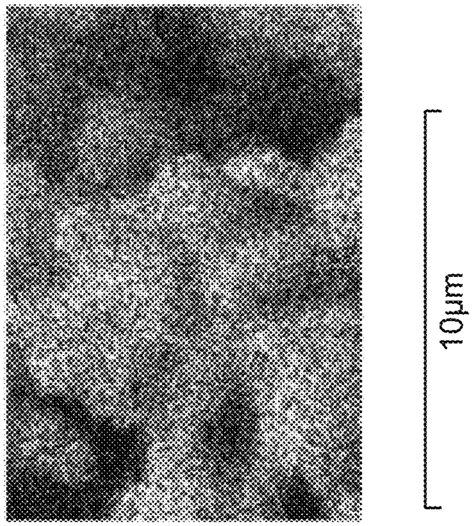
Figure 18C:
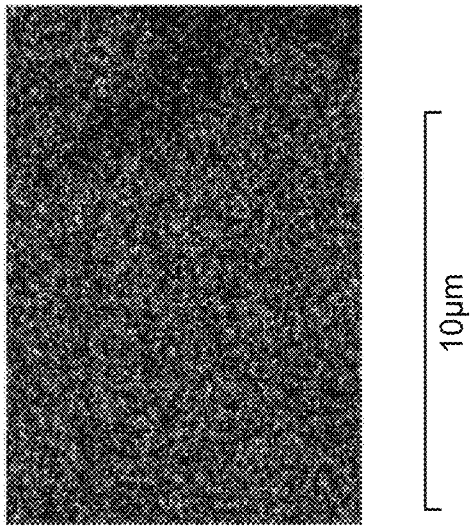

FIGS. 16, 17, and 18A-18F show SEM mapping images of HOPG like material from sample ER-03. The sample was dispersed in methanol, sonicated by ultrasound bath for 5 minutes, and drop-casted on a Si/SiO2 wafer. The mapping was obtained according with the initial EDS spectrum of the area obtained from image 23(*a*). FIG. 16 shows the image of the area to be mapped. FIG. 17 shows the EDS spectrum of the analyzed area. FIGS. 18A-18C represent the EDS mapping of carbon in FIG. 18A, oxygen in FIG. 18B, and sulfur in FIG. 18C.

Figure 19:
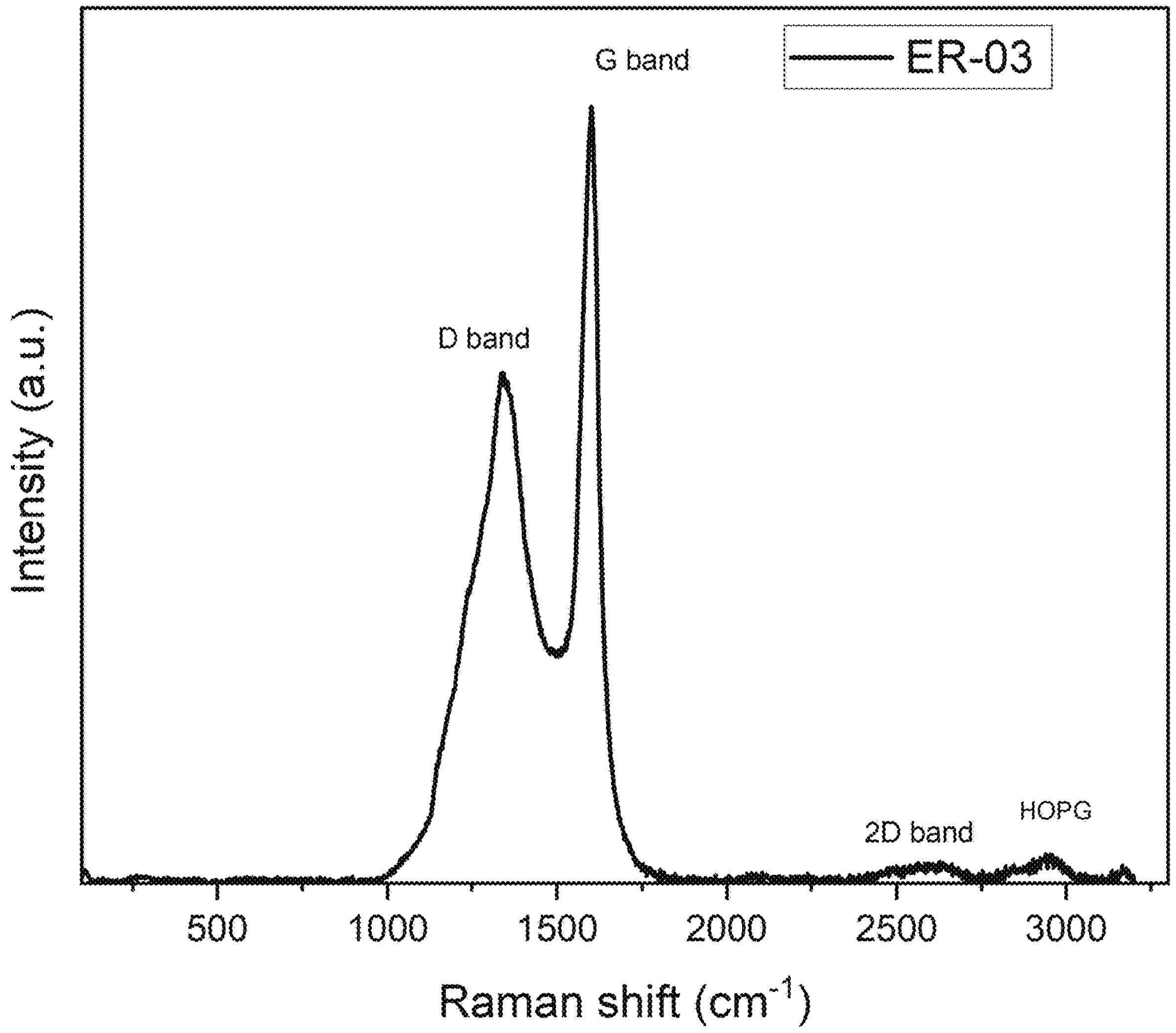
FIG. 19 shows the Raman spectrum of sample treated at about 900-950° C. using HDPE as carbon precursor and aluminum alloy as catalyst.

FIG. 19 shows Raman spectroscopy results of HOPG-like for sample ER-03. The Raman spectrum was acquired using a 532 nm laser line, acquisition time of 10 seconds, 10-15 acquisitions. The spectrum shows a D band at 1358 cm-1. The D band arises from certain defects such as vacancies, grain boundaries, etc. The G band at 1601 cm-1 corresponds to the E2g phonon of the sp2 C atoms. The peaks above 2500 cm-1 correspond to the spectral signature of highly oriented pyrolytic graphite (HOPG) like structure.

Figure 20:
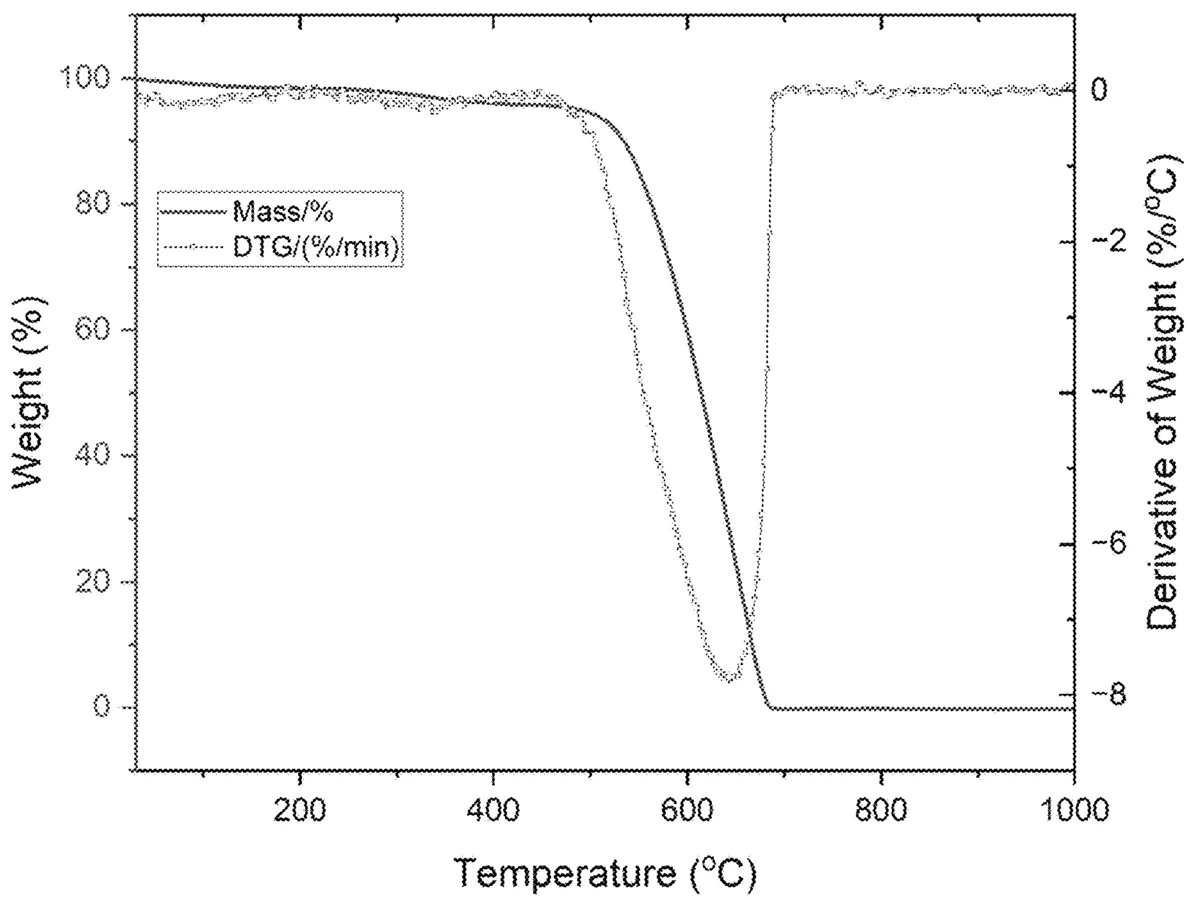
FIG. 20 shows TGA results of sample ER-03.

FIG. 20 shows a thermal gravimetric analysis of sample ER-03. The thermal gravimetric analysis was performed using synthetic air, using ~4 mg ramp from 30° C. to 1000° C., heating rate of 10° C./minute. FIG. 20 shows the thermal decomposition profile of sample ER-03 in air. The temperature of degradation of the graphene is at about 555° C. According with the data above, 96.21% of the sample decomposes at 555° C. A small degradation below 2% is observed in about 200° C. which can be attributed to equipment calibration or amorphous carbon.

ADDITIONAL EMBODIMENTS

Figure 21:
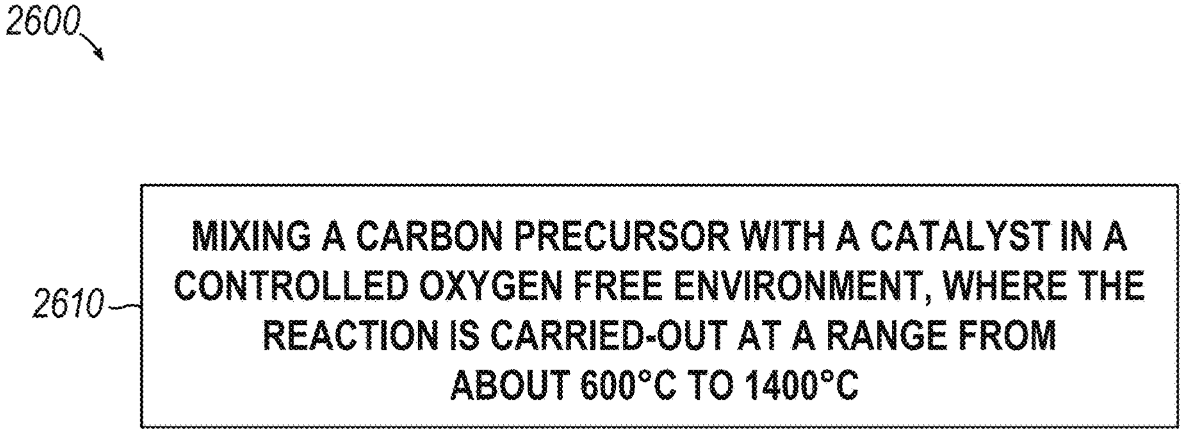
FIG. 21 shows a method embodiment under the present disclosure.

Another possible method embodiment under the present disclosure is shown in FIG. 21. Method 2600 comprises a method for manufacturing carbon material. Step 2610 is mixing a carbon precursor with a catalyst in a controlled oxygen free environment, where the reaction is carried-out at a range from about 600° C. to 1400° C. Method 2600 can comprise multiple variations and embodiments and/or additional and/or alternative steps.

Figure 22:
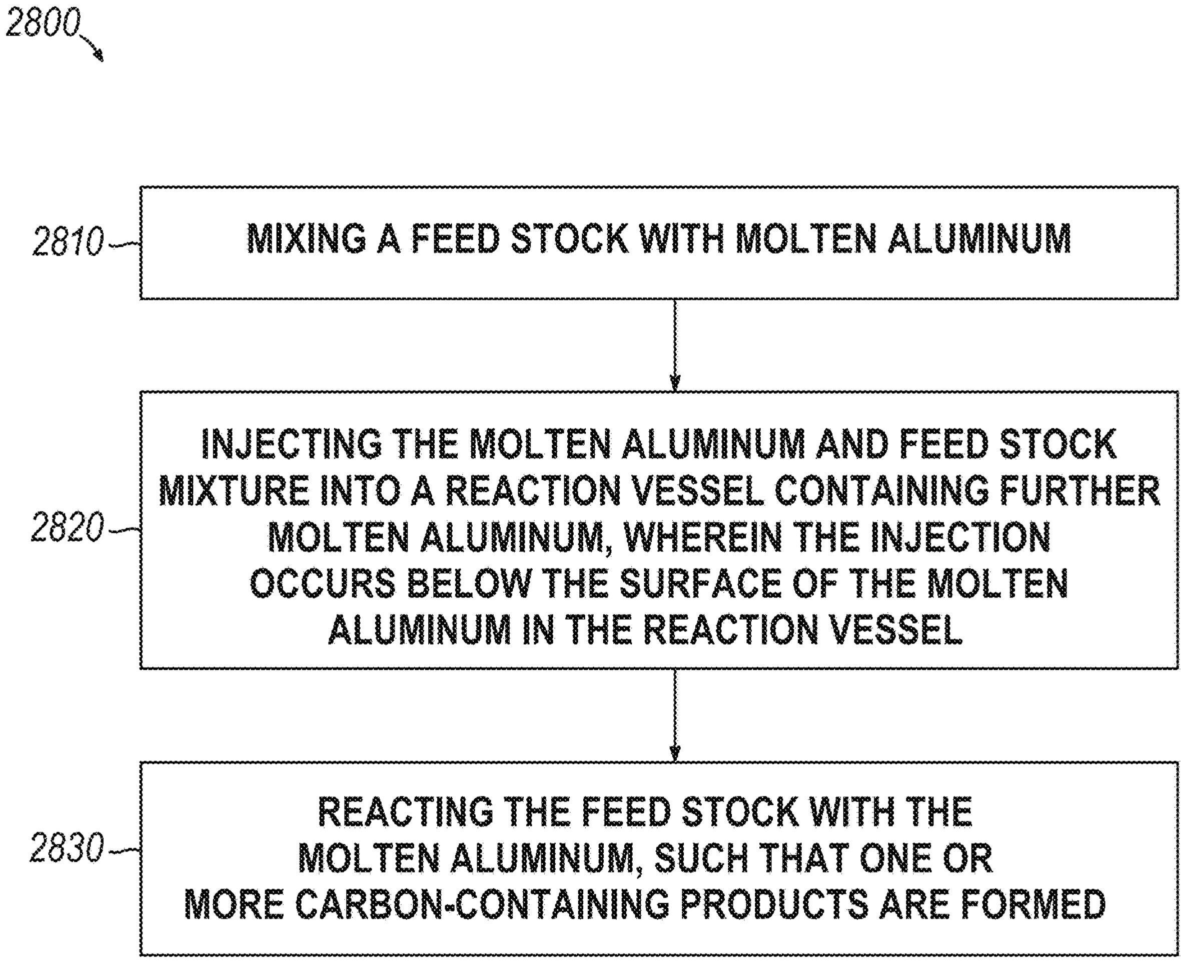
FIG. 22 shows a method embodiment under the present disclosure.

Another embodiment possible method embodiment under the present disclosure is shown in FIG. 22. Method 2800 comprises a method of synthesizing carbon. Step 2810 is mixing a feed stock with molten aluminum. Step 2820 is injecting the molten aluminum and feed stock mixture into a reaction vessel containing further molten aluminum, wherein the injection occurs below the surface of the molten aluminum in the reaction vessel. Step 2830 is reacting the feed stock with the molten aluminum, such that one or more carbon-containing products are formed. Method 2800 can comprise multiple alternative embodiments with additional or alternative steps.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by certain embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method for manufacturing carbon material, comprising:

mixing a carbon precursor with a catalyst in a controlled oxygen free environment, wherein the mixing is carried out at a range from about 600° C. to 1400° C.;

injecting the carbon precursor and catalyst mixture into a reaction vessel containing molten aluminum, wherein the injection occurs below the surface of the molten aluminum in the reaction vessel; and reacting the carbon precursor with the catalyst, such that one or more output products are formed.

2. The method of claim 1, wherein the carbon material comprises one or more of: graphene; carbon nanostructures; synthetic graphite; sulfur-graphene; highly oriented pyrolytic graphite.

3. The method of claim 1, wherein the catalyst comprises aluminum.

4. The method of claim 1, further comprising using a secondary catalyst.

5. The method of claim 4, wherein the secondary catalyst comprises one or more of: Mg, Fe, Co.

6. The method of claim 1, further comprising utilizing the presence of a chalcogenide.

7. The method of claim 6, wherein the chalcogenide comprises at least one of: oxygen; sulfur; selenium; tellurium.

8. The method of claim 1, further comprising using a carrier gas.

9. The method of claim 8, wherein the carrier gas comprises at least one of: short chain hydrocarbons; nitrogen; argon; hydrogen.

10. The method of claim 1, further comprising micronization, pulverizing, or jet milling of the one or more output products.

11. A method of synthesizing carbon, the method comprising:

mixing a feed stock with a primary catalyst, wherein the primary catalyst includes molten aluminum;

injecting the primary catalyst and feed stock mixture into a reaction vessel containing further molten aluminum, wherein the injection occurs below the surface of the molten aluminum in the reaction vessel; and reacting the feed stock with the primary catalyst, such that one or more carbon-containing products are formed, wherein the one or more carbon-containing products comprise one or more of: graphene; carbon nanostructures; synthetic graphite; sulfur-graphene; highly oriented pyrolytic graphite.

12. The method of claim 11, further comprising using a secondary catalyst.

13. The method of claim 11, further comprising utilizing the presence of a chalcogenide.

14. The method of claim 11, wherein the method avoids the use of oxygen.

15. The method of claim 11, further comprising using a carrier gas.

16. A method of synthesizing carbon, the method comprising:

mixing a feed stock with a primary catalyst and a secondary catalyst, wherein the primary catalyst includes molten aluminum;

injecting the primary catalyst, secondary catalyst, and feed stock mixture into a reaction vessel containing further molten aluminum, wherein the injection occurs below the surface of the molten aluminum in the reaction vessel; and reacting the feed stock with the primary catalyst and the secondary catalyst, such that one or more carbon-containing products are formed, wherein the one or more carbon-containing products comprise one or more of: graphene; carbon nanostructures; synthetic graphite; sulfur-graphene; highly oriented pyrolytic graphite.

17. The method of claim 16, further comprising utilizing the presence of a chalcogenide.

18. The method of claim 16, wherein the method avoids the use of oxygen.

19. The method of claim 16, further comprising using a carrier gas.

* * * * *